US012578539B2

(12) United States Patent
Chern et al.

(10) Patent No.: US 12,578,539 B2
(45) Date of Patent: Mar. 17, 2026

(54) OPTICAL COUPLING APPARATUS AND METHODS OF MAKING SAME

(71) Applicant: Taiwan Semiconductor Manufacturing Co., Ltd., Hsin-Chu (TW)

(72) Inventors: Chan-Hong Chern, Hsin-Chu (TW); Min-Hsiang Hsu, Hsin-Chu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 144 days.

(21) Appl. No.: 18/232,342

(22) Filed: Aug. 9, 2023

(65) Prior Publication Data

US 2023/0400647 A1 Dec. 14, 2023

Related U.S. Application Data

(60) Continuation of application No. 18/081,525, filed on Dec. 14, 2022, now Pat. No. 11,808,998, which is a division of application No. 17/186,661, filed on Feb. 26, 2021, now Pat. No. 11,531,173.

(51) Int. Cl.
*G02B 6/42* (2006.01)
(52) U.S. Cl.
CPC ......... *G02B 6/4215* (2013.01); *G02B 6/4206* (2013.01)

(58) Field of Classification Search
CPC .. G02B 6/4215; G02B 6/4206; G02B 6/4214; G02B 2006/12195; G02B 6/34; G02B 6/124; G02B 6/30; G02B 6/262; G02B 2006/12147
See application file for complete search history.

(56) References Cited

U.S. PATENT DOCUMENTS

| | | | |
|---|---|---|---|
| 10,365,435 B1 | 7/2019 | Karimelahi et al. | |
| 2019/0310418 A1 | 10/2019 | Karimelahi et al. | |
| 2022/0214502 A1* | 7/2022 | Fini ...................... | G02B 6/2726 |

* cited by examiner

*Primary Examiner* — John Bedtelyon
(74) *Attorney, Agent, or Firm* — Hauptman Ham, LLP

(57) ABSTRACT

Disclosed are apparatus and methods for optical coupling in optical communications. In one embodiment, an apparatus for optical coupling is disclosed. The apparatus includes: a planar layer; an array of scattering elements arranged in the planar layer at a plurality of intersections of a first set of concentric elliptical curves crossing with a second set of concentric elliptical curves rotated proximately 90 degrees to form a two-dimensional (2D) grating; a first taper structure formed in the planar layer connecting a first convex side of the 2D grating to a first waveguide; and a second taper structure formed in the planar layer connecting a second convex side of the 2D grating to a second waveguide. Each scattering element is a pillar into the planar layer. The pillar has a top surface whose shape is a concave polygon having at least 6 corners.

20 Claims, 26 Drawing Sheets

520

510

500-1

500-2

530

520

510

500-3

500—4

540

530

520

510

500–7

500-9

1200

OPTICAL COUPLING APPARATUS AND METHODS OF MAKING SAME

CROSS-REFERENCE TO RELATED APPLICATION

This application is a continuation of U.S. patent application Ser. No. 18/081,525, filed Dec. 14, 2022, now U.S. Pat. No. 11,808,998, issued Nov. 7, 2023, which is a division of U.S. patent application Ser. No. 17/186,661, filed Feb. 26, 2021, now U.S. Pat. No. 11,531,173, issued Dec. 20, 2022, the contents of each is incorporated by reference herein in their entireties

BACKGROUND

Optical gratings are frequently used to couple light between a waveguide and an optical fiber. Due to extremely different dimensions of the waveguide and the optical fiber, direct coupling would incur tremendous light loss. It is thus essential to meticulously design a waveguide light coupling apparatus for light mode field matching to the fiber dimension.

For example, an incoming light to a waveguide is usually in an unknown and arbitrary polarization state, such that a polarization splitting grating coupler (PSGC) is needed to provide polarization light in either transverse magnetic (TM) or transverse magnetic (TE) polarization mode from the optical fiber to the waveguide. The coupling efficiency of a PSGC is typically impacted by a polarization dependent loss (PDL) of TE and TM modes, which may result from non-zero fiber angle used to minimize reflections at the interface between fiber and grating. A conventional PSGC includes circular or square scattering elements at the intersection of grating lines on the grating, which results in high polarization dependent loss between TE and TM modes and degrades coupling efficiency.

As such, there exists a need to develop a method and apparatus of efficient optical coupling using optical gratings.

BRIEF DESCRIPTION OF THE DRAWINGS

Aspects of the present disclosure are best understood from the following detailed description when read with the accompanying figures. It is noted that various features are not necessarily drawn to scale. In fact, the dimensions and geometries of the various features may be arbitrarily increased or reduced for clarity of illustration.

FIGS. 5A-5K illustrate cross-sectional views of a portion of an exemplary grating coupler at various stages of a fabrication process, in accordance with some embodiments of the present disclosure.

DETAILED DESCRIPTION OF EXEMPLARY EMBODIMENTS

Figure 1:
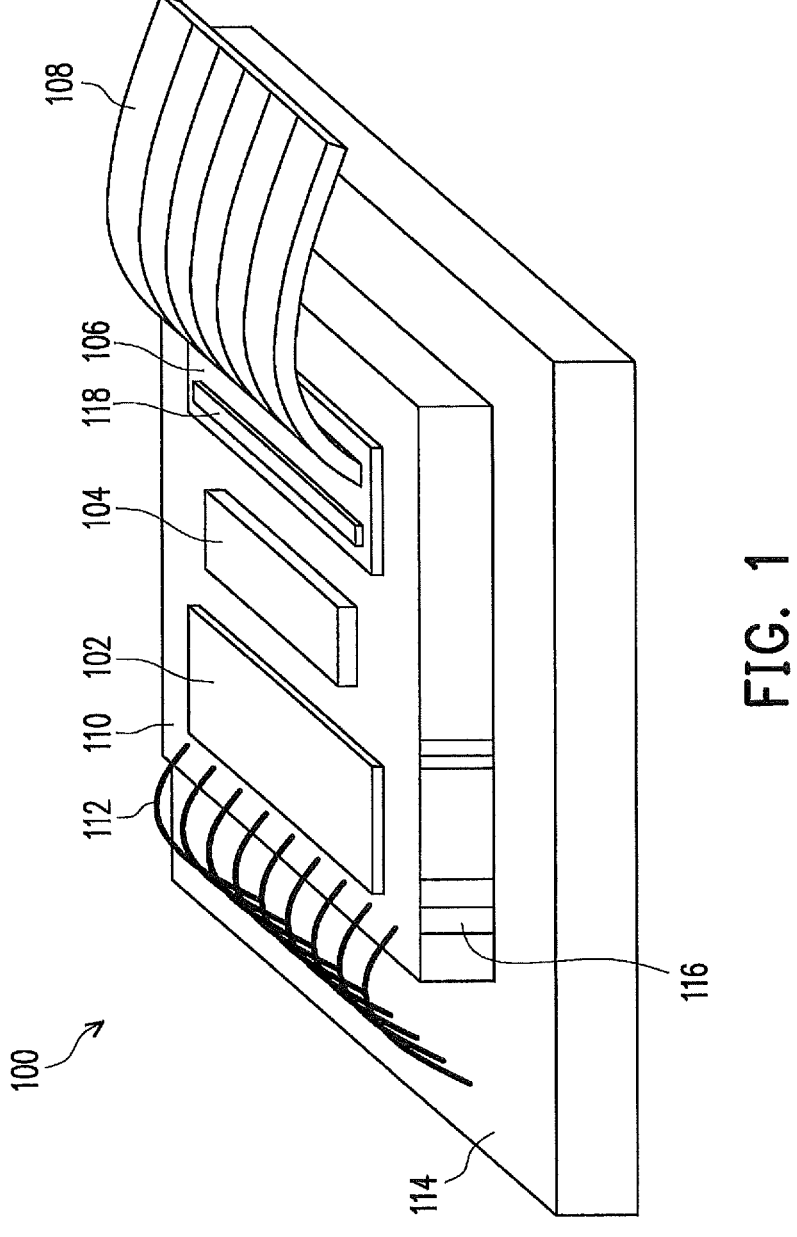
FIG. 1 illustrates an exemplary block diagram of a device, in accordance with some embodiments of present disclosure.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A waveguide surrounded by a cladding layer may confine light based on refractive index contrast between the materials in the waveguide and the cladding layer. For example, a silicon waveguide with sub-micron dimension can confine infrared light (with a wavelength larger than about 700 nanometers or 700 nm) due to its strong refractive index contrast to its silicon oxide cladding layer, wherein the refractive indices for silicon and silicon oxide are about 3.47 and 1.45, respectively. In optical systems, e.g. a data communication system using a light with a wavelength equal to about 1310 nm, or a telecommunication system using a light with a wavelength equal to about 1550 nm, a silicon waveguide usually has a height at about 200 to 350 nm, and has a width at about 370 to 470 nm, to ensure good single-mode light transmission. To receive or transmit light signals, light needs to be coupled between a waveguide and an optical fiber. But an optical fiber has a dimension at least 30 times larger than that of a waveguide. For example, a single-mode fiber typically has a diameter of at least 8 micrometers. Due to the extremely different dimensions of the waveguide and the optical fiber, direct coupling would incur tremendous light loss. It is thus essential to meticulously design a waveguide light coupling apparatus for light mode field matching to the fiber dimension. While an outgoing light from a silicon waveguide is usually in transverse magnetic (TE) mode and can be vertically coupled to a fiber using single polarization grating coupler, an incoming light to a silicon waveguide is usually in an unknown and arbitrary polarization state, such that a polarization splitting grating coupler (PSGC) is needed to provide polarization light in either transverse magnetic (TM) or transverse magnetic (TE) polarization mode from the optical fiber to the waveguide.

In one embodiment, a PSGC may be a two-dimensional (2D) grating coupler formed by two single polarization grating couplers nearly perpendicular to each other. Each single polarization grating coupler has elliptical grating lines with the major axis parallel to the fiber azimuth. The total grating area of the PSGC is larger than a core size of the fiber. The PSGC includes scattering elements at the intersection of grating lines on the 2D grating. Each scattering element may have a top surface whose shape is a concave polygon having at least 6 corners and/or at least 8 edges. Different designs of the scattering elements are disclosed to reduce the polarization dependent loss and improve light coupling efficiency from the optical fiber to the 2D grating coupler.

The sizes of the scattering elements on the disclosed grating coupler may be the same or different. In one embodiment, the scattering elements become gradually larger along a first direction from a first convex side of the 2D grating to a first concave side of the 2D grating, the first convex side being opposite to the first concave side; and the scattering elements become gradually larger along a second direction from a second convex side of the 2D grating to a second concave side of the 2D grating, the second convex side being opposite to the second concave side. This helps to improve the coupling efficiency of the grating coupler, because different scattering element sizes cause apodization to the optical coupling, which increases mode field matching of the PSGC to the fiber.

FIG. 1 illustrates an exemplary block diagram of a device 100, in accordance with some embodiments of present disclosure. It is noted that the device 100 is merely an example, and is not intended to limit the present disclosure. Accordingly, it is understood that additional functional blocks may be provided in or coupled to the device 100 of FIG. 1, and that some other functional blocks may only be briefly described herein.

Referring to FIG. 1, the device 100 comprises an electronic die 102, a light source die 104, a photonic die 106, an interposer 110 and a printed circuit board (PCB) substrate 114. The electronic die 102, light source die 104 and the photonic die 106 are coupled together through input/output interfaces (not shown) on the interposer 110. In some embodiments, the interposer 110 is fabricated using silicon. In some embodiments, the interposer 110 comprises at least one of the following: interconnecting routing, through silicon via (TSV), and contact pads. In some embodiments, the interposer 110 is to integrate all components including the electronic die 102, the light source die 104, and the photonic die 106 together. In certain embodiments, each of the dies 102/104/106 are coupled to the interposer 110 using a flip-chip (C4) interconnection method. In some embodiments, high density solder microbumps are used to couple the dies 102/104/106 to the interposer 110. Further, the interposer 110 is coupled to the PCB substrate 114 through wire bonding 112 or through silicon-vias (TSV) 116 using soldering balls. The TSVs 116 can comprise electrically conductive paths that extend vertically through the interposer 110 and provide electrical connectivity between the electronic die 102 and the PCB 114. In some embodiments, the PCB substrate 114 can comprises a support structure for the device 100, and can comprise both insulating and conductive material for isolation devices as well as providing electrical contact for active devices on the photonic die 106 as well as circuits/devices on the electronic die 102 via the interposer 110. Further, the PCB substrate 114 can provide a thermally conductive path to carry away heat generated by devices and circuits in the electronic die 102 and the light source die 104.

In some embodiments, the electronic die 102 comprises circuits (not shown) including amplifiers, control circuit, digital processing circuit, etc., as well as driver circuits for controlling the light source 104 or elements in the photonic die 106. In some embodiments, the light source die 104 comprises a plurality of components (not shown), such as at least one light emitting elements (e.g., a laser or a light-emitting diode), transmission elements, modulation elements, signal processing elements, switching circuits, amplifier, input/output coupler, and light sensing/detection circuits. In some embodiments, the light source die 104 is on the photonic die 106. In some embodiments, the photonic die 106 comprises an optical fiber array 108 attached thereon, an optical interface and a plurality of fiber-to-chip grating couplers 118. In some embodiments, the plurality of fiber-to-chip grating coupler 118 is configured to couple the light source 106 and the optical fiber array 108. In some embodiments, the optical fiber array 108 comprises a plurality of optical fibers and each of them can be a single-mode or a multi-mode optical fiber. In some embodiments, the optical fiber array 108 can be epoxied on the photonic die 106.

In some embodiments, each of the plurality of fiber-to-chip grading coupler 118 enables the coupling of optical signals between the optical fiber array 108 and the light source die 102 or corresponding photodetectors on the photonic die 106. Each of the plurality of fiber-to-chip grating couplers 118 comprises a plurality of gratings and a waveguide with designs to improve coupling efficiency between the optical fiber on the corresponding waveguide, which are discussed in details below in various embodiments of the present disclosure.

During operation, optical signals received from a remote server attached on one end of the optical fiber array 108 can be coupled through the fiber-to-chip grating couplers 118 attached to the other end of the optical fiber array 108 to the corresponding photodetectors on the photonic die 106. Alternatively, optical signals received from the light source die 104 can be coupled through the fiber-to-chip grating couplers 118 to the optical fiber array 108 which can be further transmitted to the remote server.

Figure 2A:
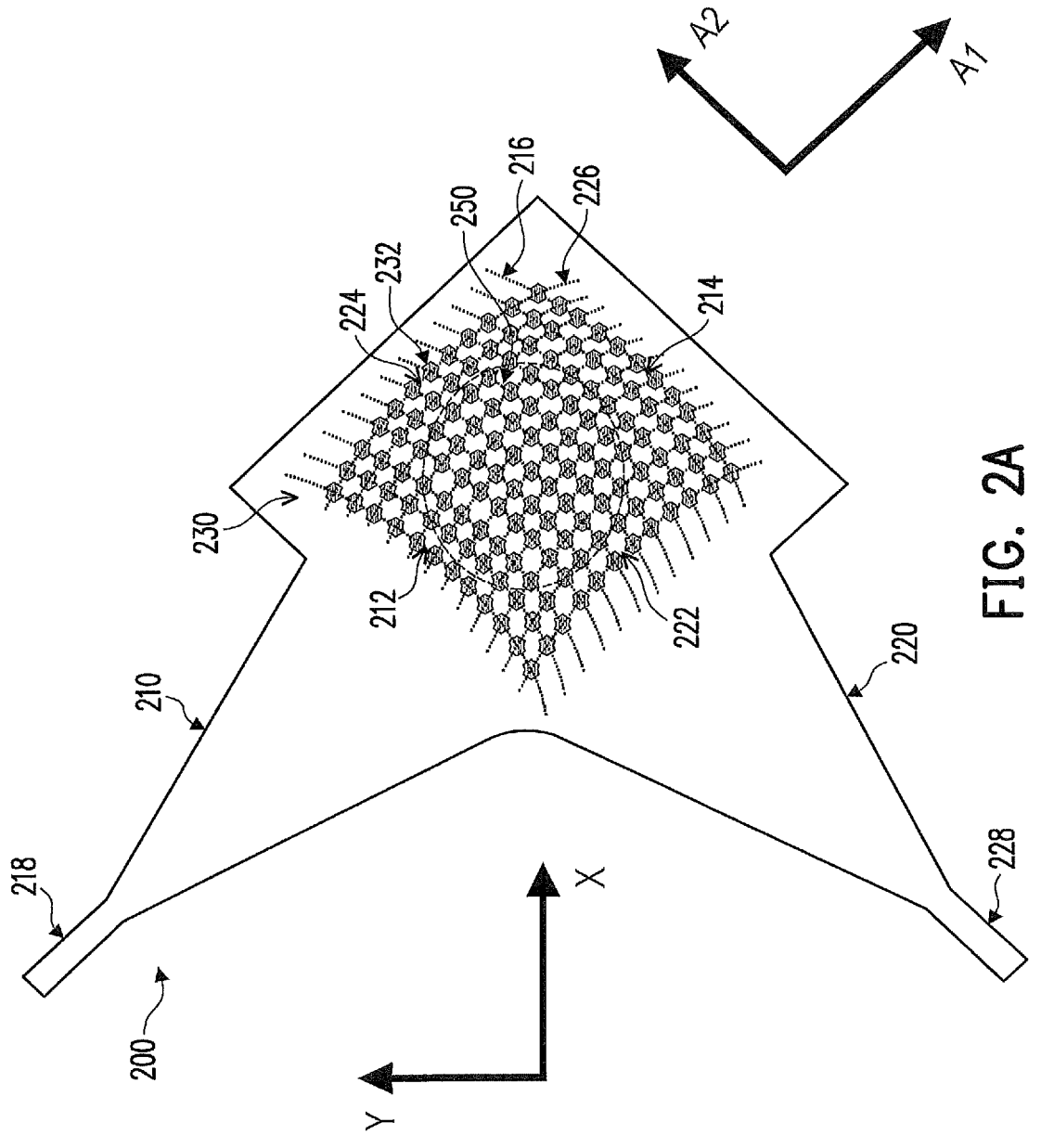
FIG. 2A illustrates a top view of an exemplary two-dimensional (2D) grating coupler, in accordance with some embodiments of the present disclosure.

FIG. 2A illustrates a top view of an exemplary two-dimensional (2D) grating coupler 200, in accordance with some embodiments of the present disclosure. As shown in FIG. 2A, the 2D grating coupler is formed by two single polarization grating couplers nearly perpendicular to each other. Each single polarization grating coupler has a respective taper region and a shared grating region 230. The first single polarization grating coupler includes a first taper structure 210 and the shared grating region 230; and the second single polarization grating coupler includes a second taper structure 220 and the shared grating region 230.

In one embodiment, the first taper structure 210, the second taper structure 220 and the shared grating region 230 are all formed in a planar layer, which may be a semiconductor layer, e.g. a silicon layer on a silicon-on-insulator (SOI) substrate. In one embodiment, the first taper structure 210 is formed in the planar layer connecting a first convex side 212 of the 2D grating 230 to a first waveguide 218 in the planar layer; and the second taper structure 220 is formed in the planar layer connecting a second convex side 222 of the 2D grating 230 to a second waveguide 228 in the planar layer.

As shown in FIG. 2A, each single polarization grating coupler has elliptical grating lines that are concentric elliptical curves. The first single polarization grating coupler includes a first set of concentric elliptical curves 216; and the second single polarization grating coupler includes a second set of concentric elliptical curves 226 that are rotated proximately 90 degrees to form a two-dimensional (2D) grating. The two single polarization grating couplers share the grating region 230 including the 2D grating and an array of scattering elements 232 arranged in the planar layer at a plurality of intersections of the first set of concentric elliptical curves crossing with the second set of concentric elliptical curves. Any numbers of elliptical curves in each single polarization grating coupler and any numbers of scattering elements 232 on each elliptical curve can be used and are within the scope of the present disclosure.

In a first embodiment, the grating coupler 200 scatters incident light received from the first waveguide 218 in a direction perpendicular to the grating curves 216 along the radius direction A1, a direction from the first convex side 212 of the 2D grating to a first concave side 214 of the 2D grating, the first convex side 212 being opposite to the first concave side 214. In a second embodiment, the grating coupler 200 scatters incident light received from the second waveguide 228 in a direction perpendicular to the grating curves 226 along the radius direction A2, a direction from the second convex side 222 of the 2D grating to a second concave side 224 of the 2D grating, the second convex side 222 being opposite to the second concave side 224. In either the first embodiment or the second embodiment, the incident light is scattered out of the 2D grating, which includes periodic gratings formed by the array of scattering elements.

In a third embodiment, the 2D grating coupler 200 scatters incident light received from a fiber having a core size 250 attached to the 2D grating. The 2D grating coupler 200 is configured for splitting the incident light received from the fiber on top of the planar layer to a parallel polarization component and an orthogonal polarization component. In this embodiment, the first waveguide 218 comprises a first output port located substantially at a focal point of the first set of elliptical curves 216; and the second waveguide 228 comprises a second output port located substantially at a focal point of the second set of elliptical curves 226. The 2D grating coupler 200 couples the parallel polarization component to the first output port in the first waveguide 218 via the first taper structure 210; and couples the orthogonal polarization component to the second output port in the second waveguide 228 via the second taper structure 220. Alternatively, the 2D grating coupler 200 can couple the orthogonal polarization component to the first output port in the first waveguide 218 via the first taper structure 210; and couples the parallel polarization component to the second output port in the second waveguide 228 via the second taper structure 220.

As shown in FIG. 2A, the first taper structure 210 has a reducing first width from the first convex side 212 to the first waveguide 218; and the second taper structure 220 has a reducing second width from the second convex side 222 to the second waveguide 228. In one embodiment, the first taper structure 210 is configured for transmitting a first portion of the incident light from the fiber to the first waveguide 218 to achieve a minimum insertion loss; and the second taper structure 220 is configured for transmitting a second portion of the incident light to the second waveguide 228 to achieve a minimum insertion loss. The first portion of the incident light is substantially a parallel polarization component of the incident light, and the second portion of the incident light is substantially an orthogonal polarization component of the incident light. Each of the parallel polarization component and the orthogonal polarization component comprises a polarized light split from the incident light. The polarized light has either a transverse magnetic (TM) polarization mode or a transverse magnetic (TE) polarization mode.

As shown in FIG. 2A, in the first set of concentric elliptical curves and the second set of concentric elliptical curves of the 2D grating, each elliptical curve has an equal spacing relative to an adjacent concentric elliptical curve, where the spacing may be configured as a grating period of the 2D grating.

Figure 2B:
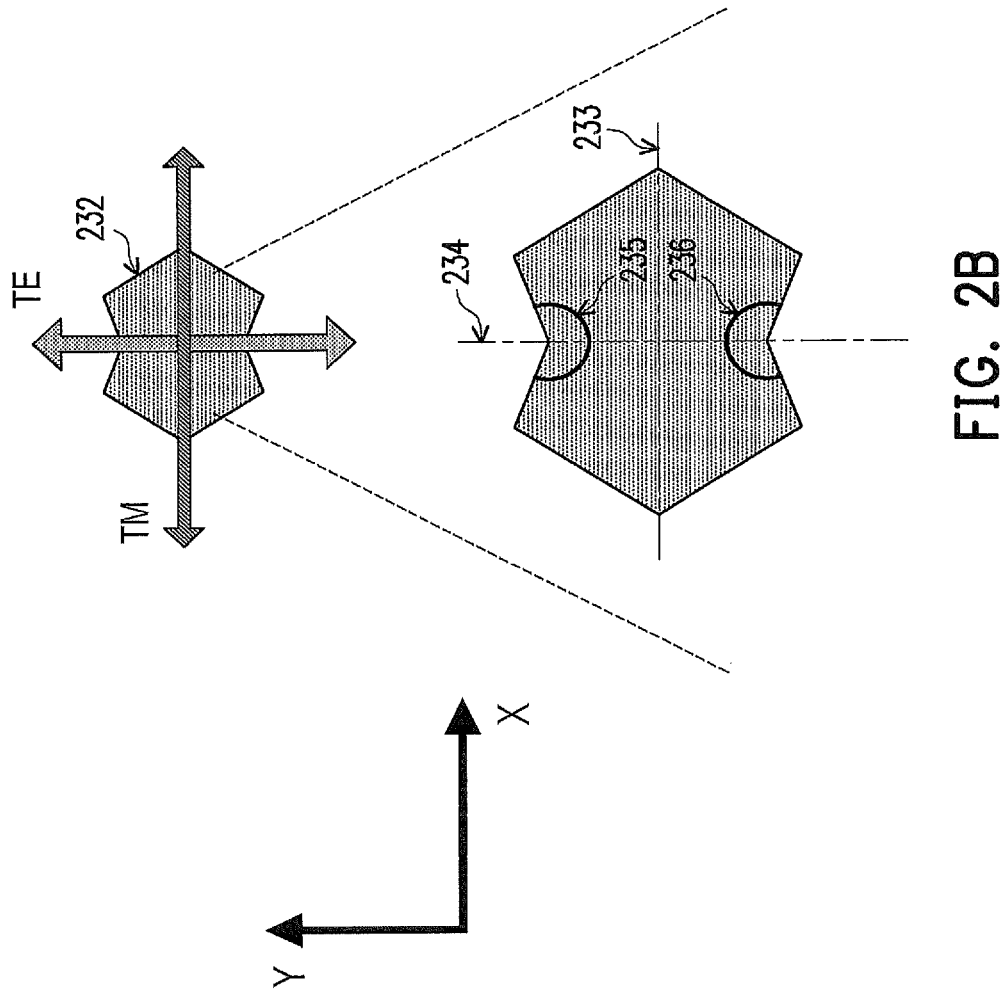
FIG. 2B illustrates an exemplary scattering element in a 2D grating coupler, in accordance with some embodiments of the present disclosure.

In one embodiment, each scattering element is a pillar into the planar layer, where the pillar has a top surface whose shape is a concave polygon. FIG. 2B illustrates an exemplary scattering element 232 in a 2D grating coupler, e.g. the 2D grating coupler 200 in FIG. 2A, in accordance with some embodiments of the present disclosure. The scattering element 232 in FIG. 2B has a shape of a concave polygon having 2 reflex interior angles 235, 236 and 8 edges in total. The concave polygon has reflection symmetry about a line 234 crossing the 2 reflex interior angles to divide the concave polygon into two equal convex pentagons. As shown in FIG. 2B, the concave polygon has 6 corners that do not have reflex interior angles.

As shown in FIG. 2B, the concave polygon has 2-fold rotational symmetry; but has no N-fold rotational symmetry, when N is larger than 2. That is, the concave polygon will look exactly the same after a rotation by an angle of 360°/2=180'; but will look exactly the same after a rotation by an angle of 360°/N, when N is larger than 2.

Figure 3A:
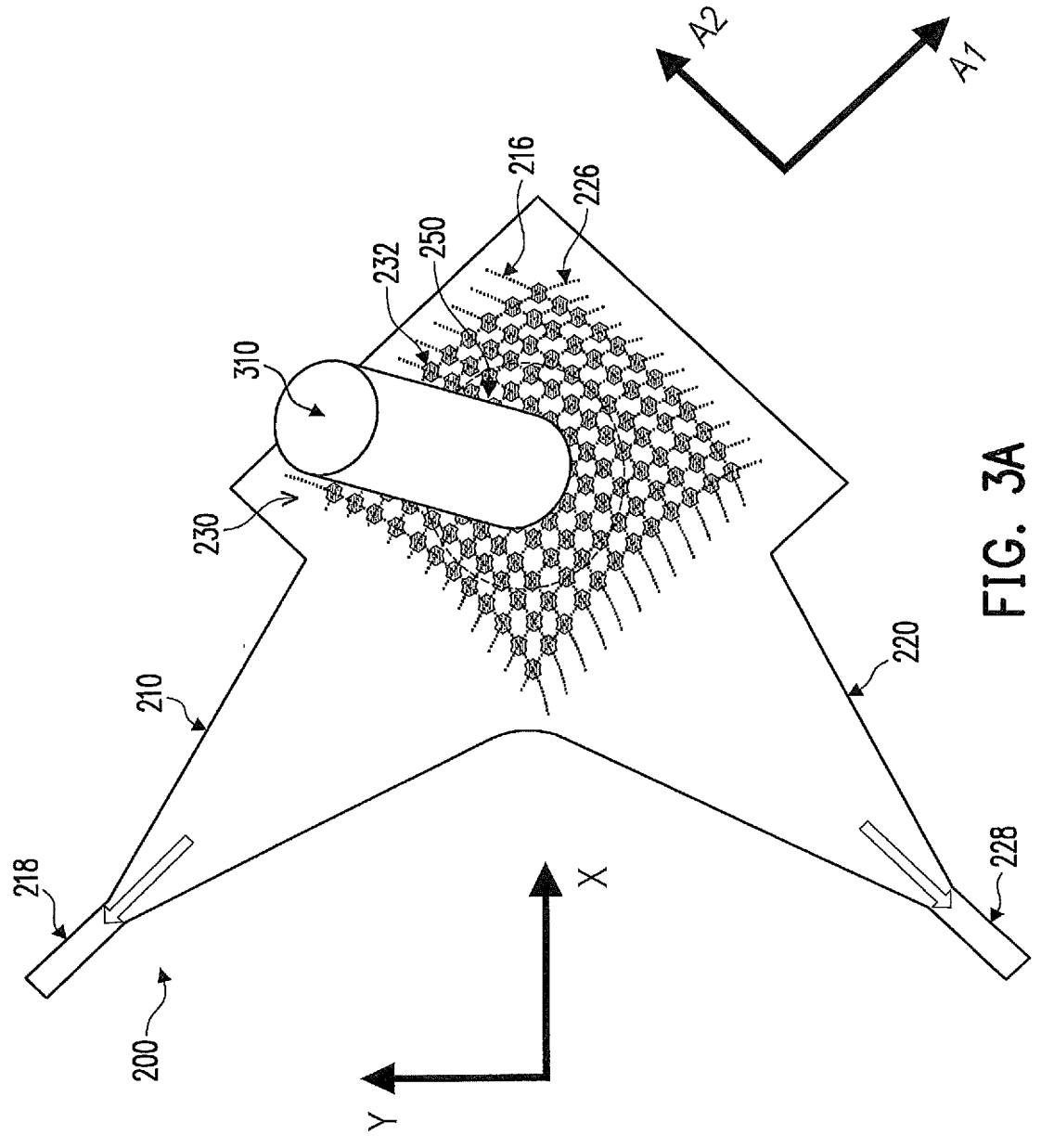
FIG. 3A illustrates a top view of an exemplary 2D grating coupler with an optical fiber, in accordance with some embodiments of the present disclosure.

FIG. 3A illustrates a top view of an exemplary 2D grating coupler 200 with an optical fiber 310, in accordance with some embodiments of the present disclosure. As discussed above, both the optical fiber 310 and the 2D grating coupler 200 may be attached to or included in a photonic die on a substrate. The 2D grating coupler 200 includes an array of scattering elements 232 on the photonic die for transmitting light between the photonic die and the optical fiber 310.

In one embodiment, a total area of the array of scattering elements 232 in the top surface of the planar layer is slightly larger than a core size 250 of the optical fiber 310 and is determined based on a diameter of the optical fiber 310. In one example, when the optical fiber 310 has a diameter of about 8 to 10 micrometers, the core size 250 of the optical fiber 310 is about 15 to 20 micrometers.

Figure 3B:
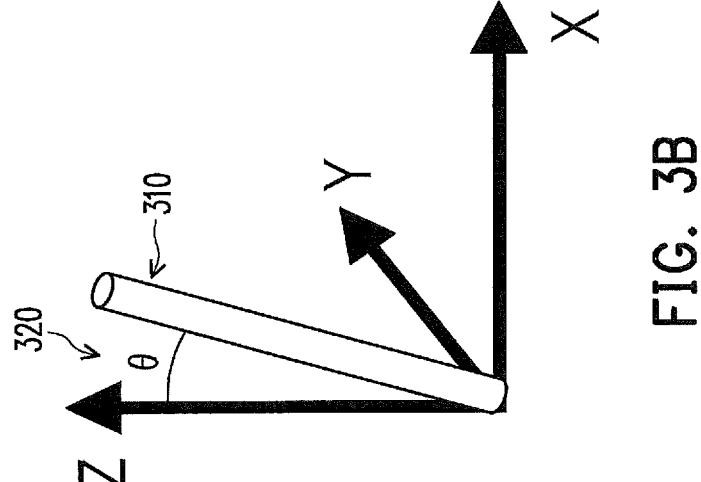
FIG. 3B illustrates an exemplary incident angle of an optical fiber to a 2D grating coupler, in accordance with some embodiments of the present disclosure.

In one embodiment, the 2D grating 230 of the coupler 200 is configured for receiving an incident light from the optical fiber 310 with an incident angle 320, as shown in FIG. 3B. The incident angle 320 is measured in plane of incidence between an axis of the optical fiber 310 and the Z direction, a direction perpendicular to the planar layer. The plane of incidence is a plane which contains the surface normal of the planar layer and the propagation vector of the incident light. That is, the plane of incidence is the plane formed by the Z direction and the X direction.

Referring to both FIG. 2B and FIG. 3B, the line 234 is along the Y direction, which is a direction in a top surface of the planar layer and perpendicular to the plane of incidence of an incident light from the optical fiber 310. In one embodiment, each scattering element 232 has a first length along the Y direction, and has a second length along the X direction that is in the top surface and perpendicular to the Y direction. In one embodiment, a ratio of the second length to the first length may be determined based on the incident angle 320. As shown in FIG. 2B, the concave polygon is symmetric about a line 234 along the Y direction and is symmetric about a line 233 along the X direction. In some embodiments, the incident angle 320 can be configured in a range of 5-15 degrees according to the structure, geometry, pattern, and material properties of the 2D grating coupler 200 including the scattering elements 232.

Polarized light with its electric field along the plane of incidence is referred to as transverse-magnetic (TM) polarized, while light whose electric field is normal to the plane of incidence is called transverse-electric (TE) polarized. FIG. 2B also shows the direction of the electric field of an incident light, when the incident light is TM and TE polarized respectively. As shown in FIG. 2B, the electric field of an incident light is along the X direction when the incident light is TM polarized; and is along the Y direction when the incident light is TE polarized.

In one embodiment, the incident angle of the incident light from the fiber is zero. Each scattering element in this embodiment may have a shape of a concave polygon that is in the top surface of the planar layer and has a 4-fold rotational symmetry. That is, the concave polygon will look exactly the same after a rotation by an angle of $360°/4=90°$. In this case, the ratio of the second length to the first length is equal to one.

In another embodiment, the incident angle is non-zero; and the ratio of the second length to the first length is larger than one. As such, each scattering element in this embodiment may have a shape of a concave polygon that is in the top surface of the planar layer and does not have a 4-fold rotational symmetry. That is, the concave polygon in this embodiment will not look exactly the same after a rotation by an angle of $360°/4=90°$. In other embodiments, the ratio of the second length to the first length becomes larger as the incident angle becomes larger.

Figure 4A:
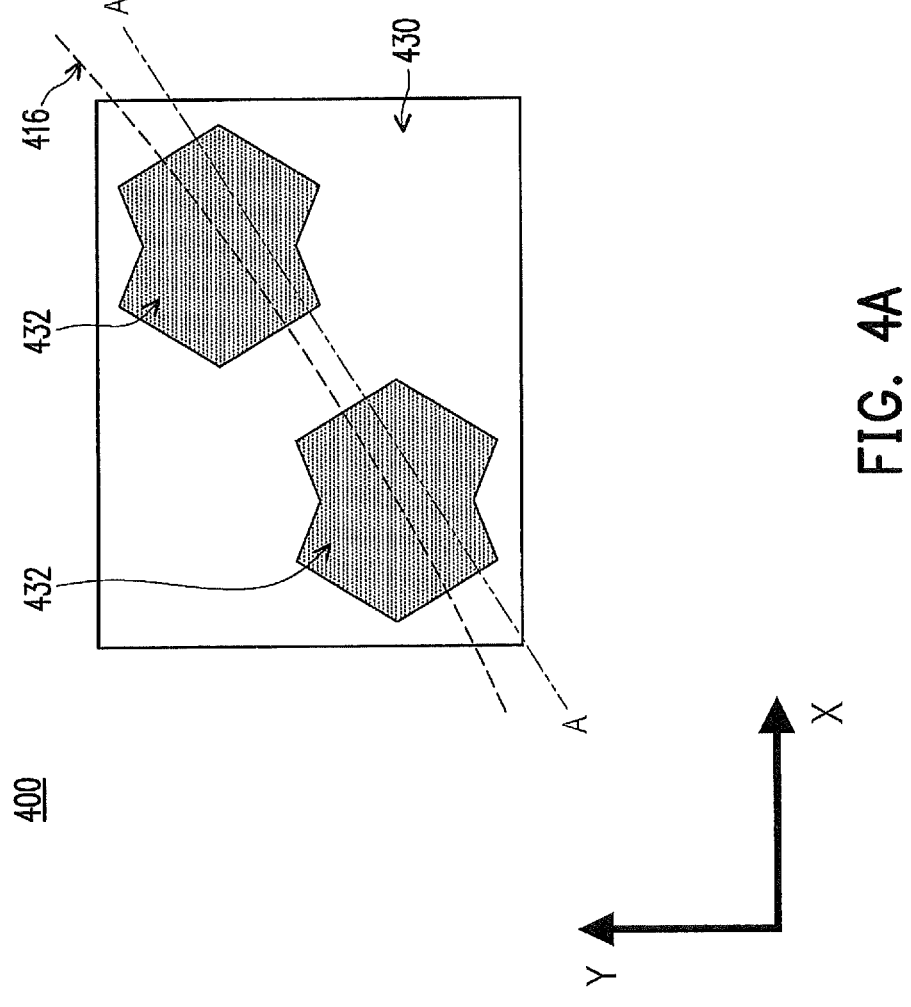
FIG. 4A illustrates a top view of a portion of a 2D grating coupler, in accordance with some embodiments of the present disclosure.

FIG. 4A illustrates a top view of a portion 400 of a 2D grating coupler, in accordance with some embodiments of the present disclosure. As shown in FIG. 4A, the grating portion 400 includes two scattering elements 431, 432, adjacent to each other on a grating curve 416, which may be one of a set of concentric elliptical curves of a 2D grating region of the grating coupler.

In one embodiment, the scattering elements 431, 432 are formed in a semiconductor layer 430. In one embodiment, the scattering elements 431, 432 comprise a dielectric material such as silicon oxide, while the semiconductor layer 430 comprises a semiconductor material such as silicon.

Figure 4B:
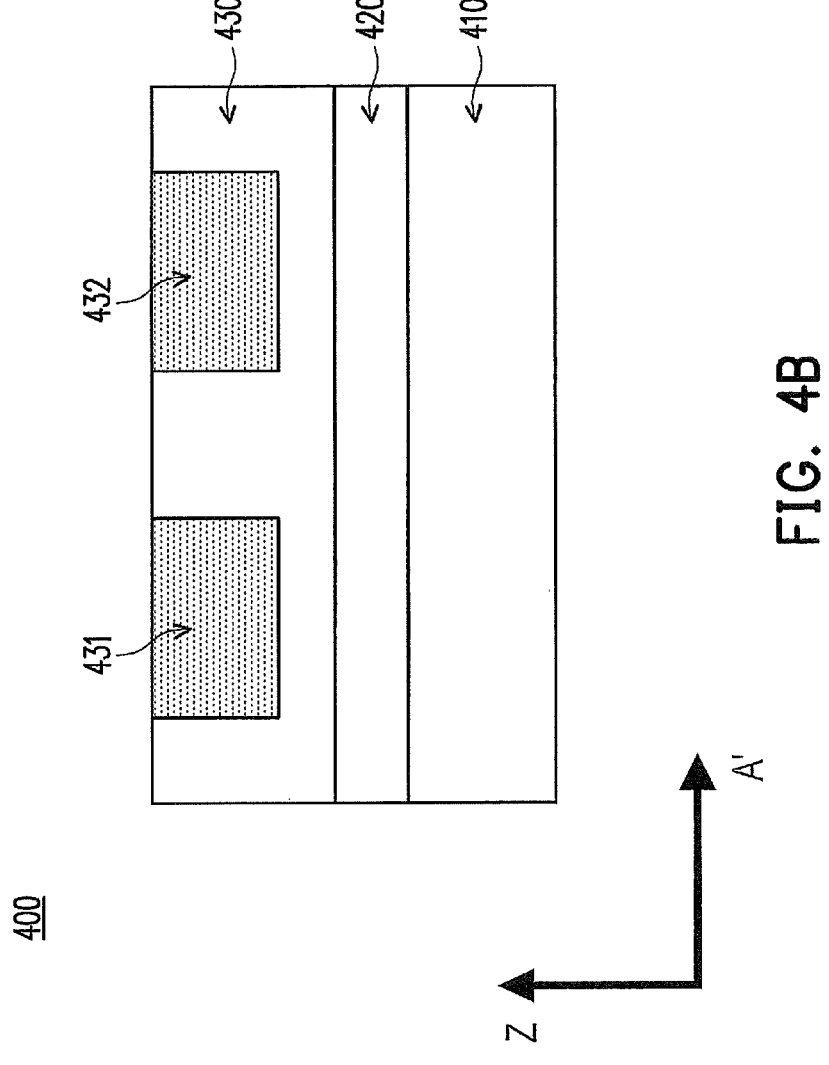
FIG. 4B illustrates a cross-sectional view of a portion of a 2D grating coupler, in accordance with some embodiments of the present disclosure.

FIG. 4B illustrates a cross-sectional view of the 2D grating coupler portion 400 along the direction A-A' in FIG. 4A, in accordance with some embodiments of the present disclosure. In the illustrated embodiments, the 2D grating coupler 400 fabricated on a semiconductor substrate 410 comprises a multi-layered structure comprising an insulation layer 420 and a semiconductor layer 430.

In the illustrated embodiment, the semiconductor substrate 410 comprises silicon. The insulation layer 420 comprises a dielectric material such as silicon oxide, and is fabricated on the semiconductor substrate 410 using chemical vapor deposition, physical vapor deposition, etc. In some embodiments, the insulation layer 420 can be replaced by other types of dielectric materials, such as Si3N4, SiO2 (e.g., quartz, and glass), Al2O3, and H2O, according to various embodiments of the present disclosure.

In some embodiments, the semiconductor layer 430 comprises silicon and is deposited on the insulation layer 420 using chemical vapor deposition. In some embodiments, the semiconductor substrate 410, the insulation layer 420 and the semiconductor layer 430 are formed as a silicon-on-insulator (SOI) substrate.

In some embodiments, the scattering elements 431, 432 are formed according to a predetermined pattern as shown in FIG. 2A. In some embodiments, the scattering elements 431, 432 are formed as part of a cladding layer comprising silicon oxide. In some embodiments, the cladding layer can comprise other types of dielectric materials according to different applications, including polycrystalline silicon and silicon nitride.

In some embodiments, the 2D grating coupler 400 may further comprise: a bottom reflection layer that is located between the semiconductor substrate 410 and the insulation layer 420 and comprises at least one of the following: Al, Cu, Ni, and a combination; and/or a top reflection layer that is located on the cladding layer and comprises at least one of the following: Al, Cu, Ni and a combination. In some embodiments, the top reflection layer only covers the taper structures of the 2D grating coupler 400. In some embodiments, the taper structures (not shown) of the 2D grating coupler 400 comprise the same material used in the semiconductor layer 430. In other embodiments, the taper structures comprise a second material that is different from the material used in the semiconductor layer 430.

Figure 5A:
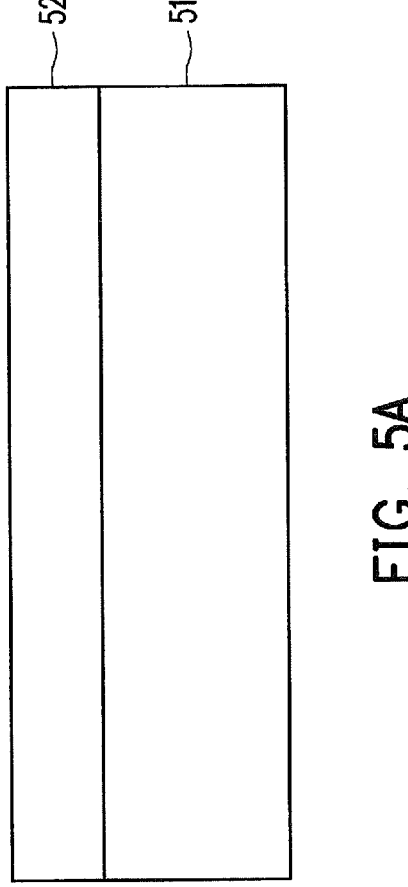

FIGS. 5A-5K illustrate cross-sectional views of a portion of an exemplary grating coupler 500 at various stages of a fabrication process, in accordance with some embodiments of the present disclosure. FIG. 5A is a cross-sectional view of the grating coupler 500-1 including a first layer 510 and a second layer 520 disposed on the first layer 510, at one of the various stages of fabrication, according to some embodiments of the present disclosure. The first layer 510 may be formed of silicon or another semiconductor material as a substrate. The second layer 520 may be formed of silicon oxide or another oxide material as an insulation layer.

Figure 5B:
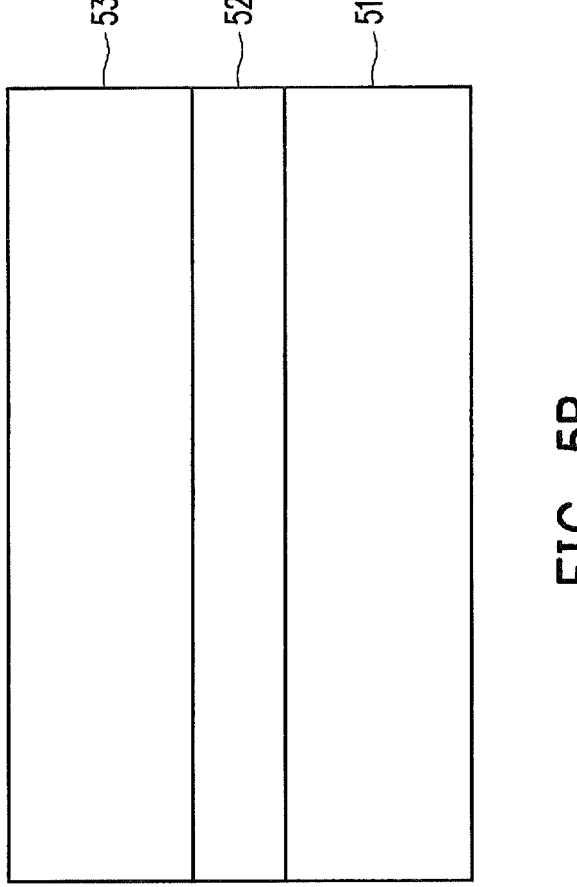

FIG. 5B is a cross-sectional view of the grating coupler 500-2 including a semiconductor layer 530 formed on the insulation layer 520 at one of the various stages of fabrication, according to some embodiments of the present disclosure. The semiconductor layer 530 may be formed by an epitaxial growth of a semiconductor material, e.g. silicon, on the insulation layer 520.

Figure 5C:
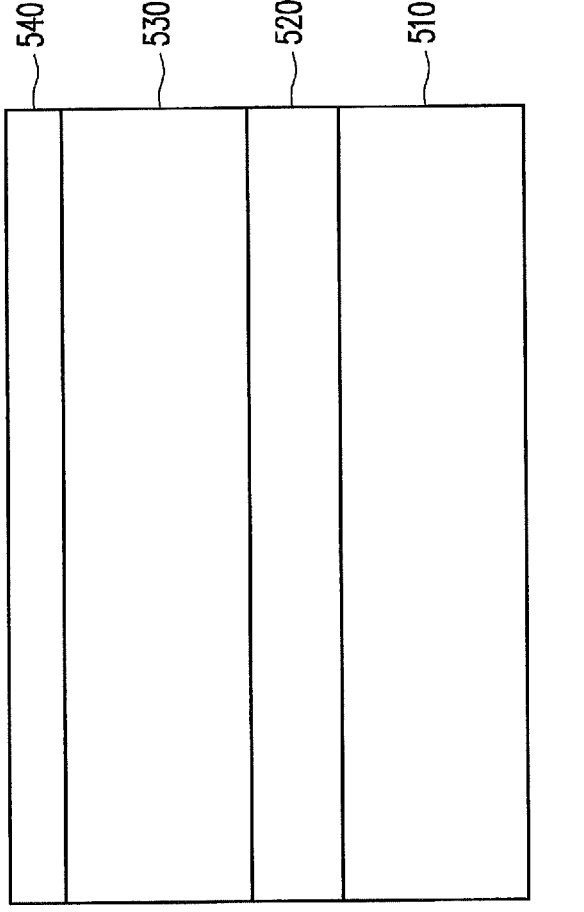

FIG. 5C is a cross-sectional view of the grating coupler 500-3 including a hard mask layer 540 deposited on the semiconductor layer 530 at one of the various stages of fabrication, according to some embodiments of the present disclosure. The hard mask layer 540 on the semiconductor layer 530 may comprise an organic or inorganic material.

Figure 5D:
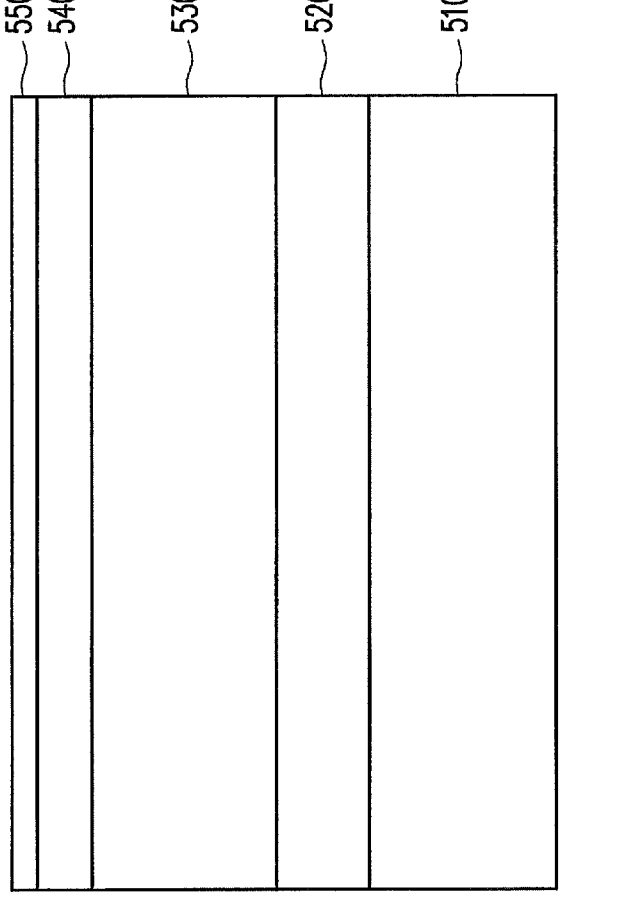

FIG. 5D is a cross-sectional view of the grating coupler 500-4 including a photoresist layer 550 deposited on the hard mask layer 540 at one of the various stages of fabrication, according to some embodiments of the present disclosure. The photoresist layer 550 on the hard mask layer 540 may comprise a photoresist material.

Figure 5E:

FIG. 5E is a cross-sectional view of the grating coupler 500-5 including patterned portions of the photoresist layer 550, formed on the hard mask layer 540 at one of the various stages of fabrication, according to some embodiments of the present disclosure. The photoresist layer 550 is patterned according a predetermined pattern, e.g. by removing portions corresponding to the scattering elements shown in FIGS. 1-4, based on waveguide lithography and development.

Figure 5F:
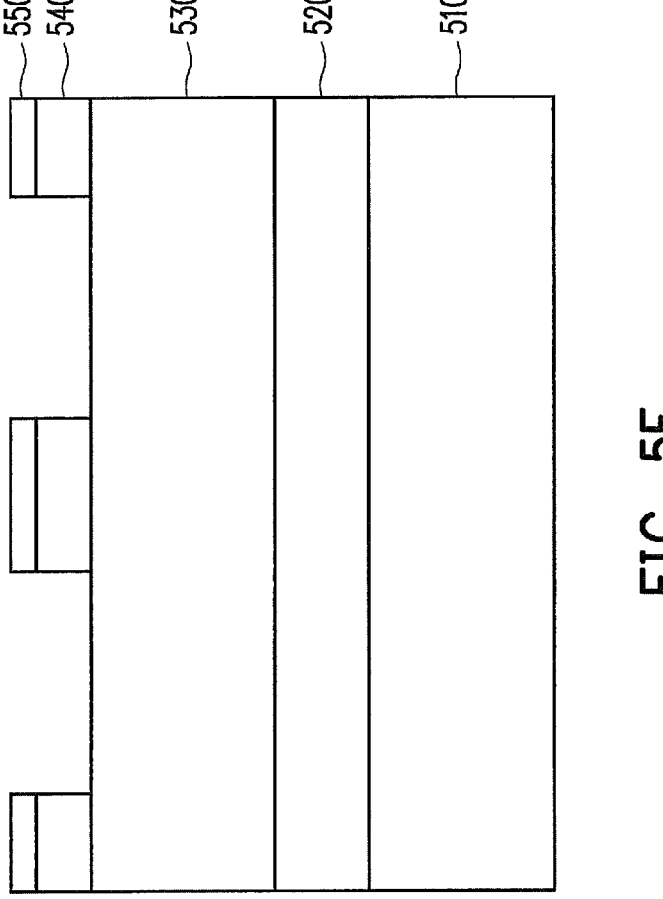

FIG. 5F is a cross-sectional view of the grating coupler 500-6 including patterned portions of the hard mask layer 540, formed at one of the various stages of fabrication, according to some embodiments of the present disclosure. Because the photoresist layer 550 was patterned to have openings over the hard mask layer 540, the portions of the hard mask layer 540 that are exposed by the photoresist layer 550 are removed, e.g., via a wet or dry etch procedure.

Figure 5G:
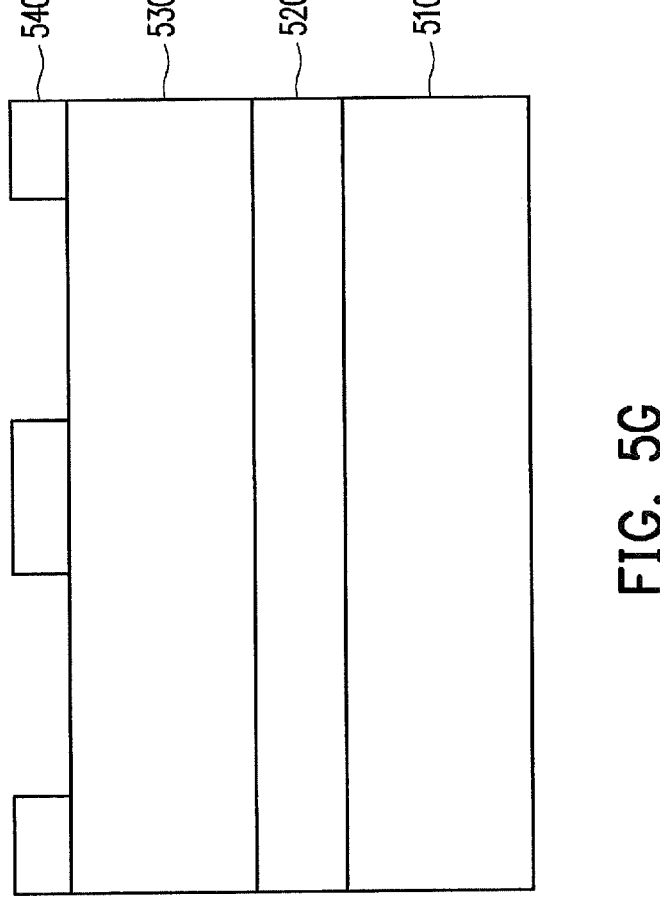

FIG. 5G is a cross-sectional view of the grating coupler 500-7, where the photoresist layer 550 is removed at one of the various stages of fabrication, according to some embodiments of the present disclosure. For example, the photoresist layer 550 may be removed by a resist stripping.

Figure 5H:
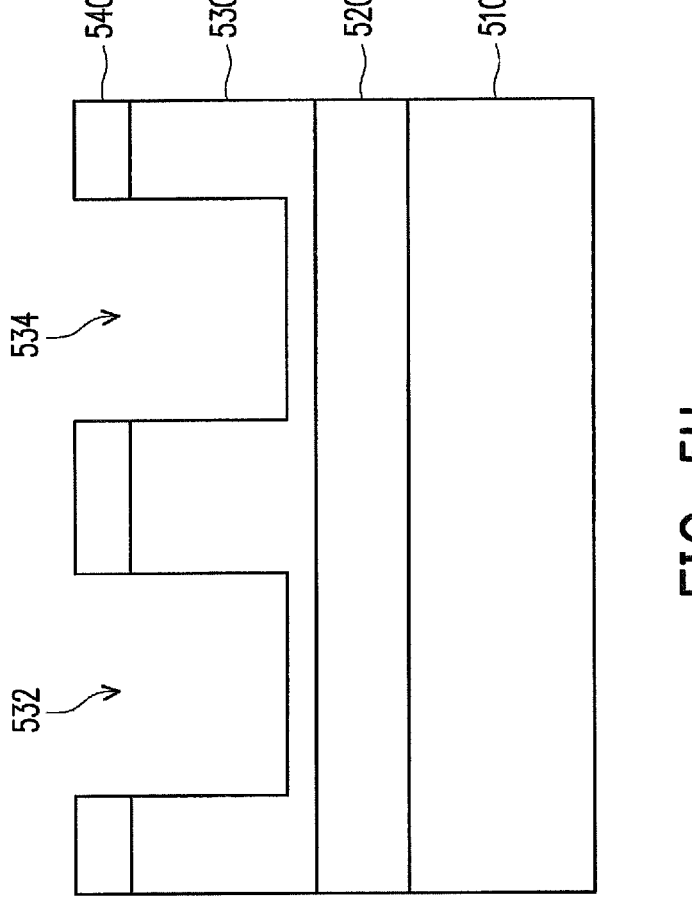
Figure 51:
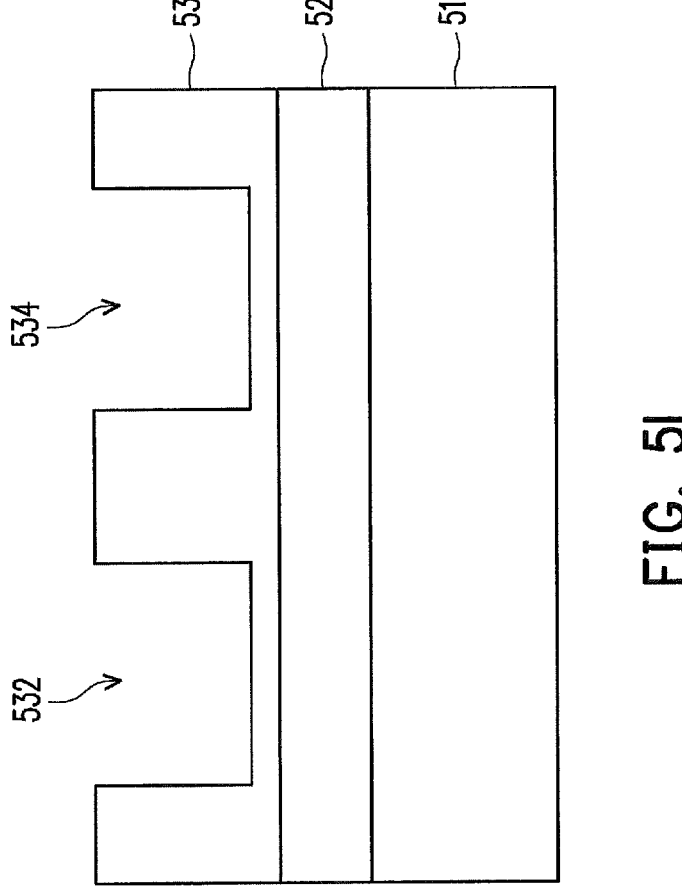

FIG. 5H is a cross-sectional view of the grating coupler 500-8 including an array of etched regions 532, 534, formed at one of the various stages of fabrication, according to some embodiments of the present disclosure. Because the hard mask layer 540 was patterned to have openings over the semiconductor layer 530, the portions of the semiconductor layer 530 that are exposed by the hard mask layer 540 are removed, e.g., via a wet or dry etch procedure, to form the array of etched regions 532, 534.

In some embodiments, surfaces of the etched regions 532, 534 may be smoothed by: oxidizing the silicon surfaces of the etched regions 532, 534; etching the silicon oxide surfaces; and repeating the oxidizing and the etching several times to smooth the surfaces of the etched regions 532, 534.

FIG. 5I is a cross-sectional view of the grating coupler 500-9, where the hard mask layer 540 is removed at one of the various stages of fabrication, according to some embodiments of the present disclosure. For example, the hard mask layer 540 may be removed by a resist stripping.

Figure 5J:
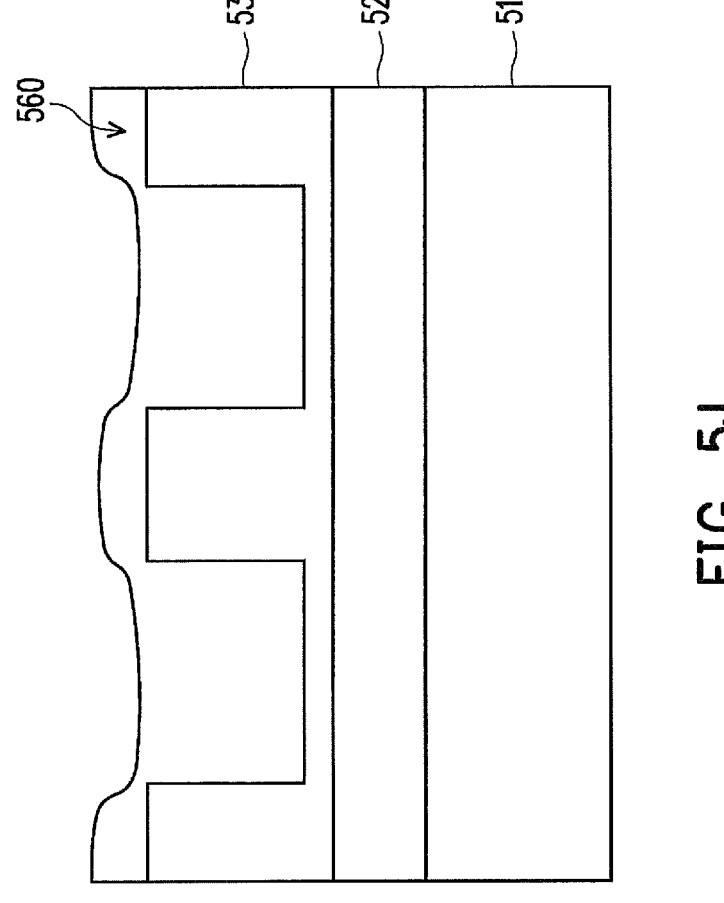

FIG. 5J is a cross-sectional view of the grating coupler 500-10 including a cladding layer 560, which is formed at one of the various stages of fabrication, according to some embodiments of the present disclosure. The cladding layer 560 may be formed by depositing a dielectric material such as silicon oxide over the semiconductor layer 530 and into the array of etched regions 532, 534.

Figure 5K:
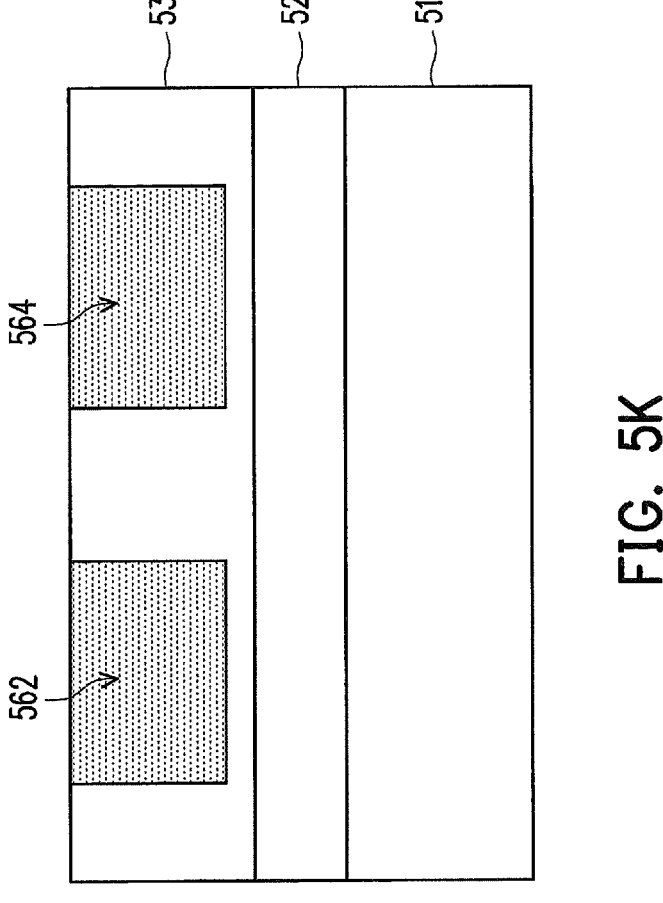

FIG. 5K is a cross-sectional view of the grating coupler 500-11, where the top portion of the cladding layer 560 is polished at one of the various stages of fabrication, according to some embodiments of the present disclosure. The top portion of the cladding layer 560 may be polished to form an array of scattering elements 562, 564 in the array of etched regions 532, 534, e.g. based on a chemical-mechanical polishing process.

Figure 6:
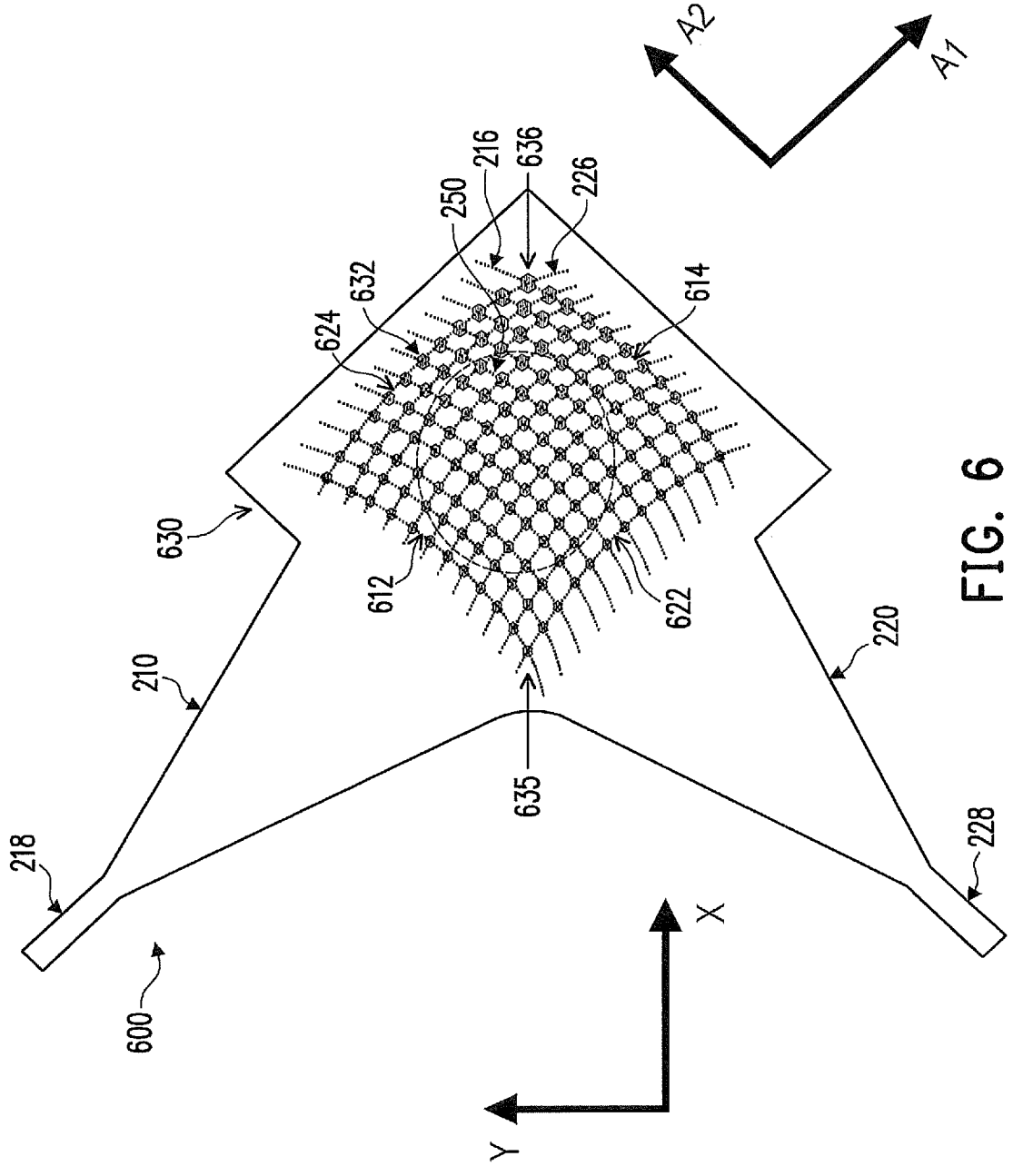
FIG. 6 illustrates a top view of an exemplary 2D grating coupler with apodization scattering patterns, in accordance with some embodiments of the present disclosure.

FIG. 6 illustrates a top view of an exemplary 2D grating coupler 600 with apodization scattering patterns, in accordance with some embodiments of the present disclosure. The 2D grating coupler 600 in FIG. 6 is the same as the 2D grating coupler 200 in FIG. 2A, except that the 2D grating coupler 600 has a grating region 630 including 2D grating formed by an array of scattering elements 632 that become gradually larger along the A1 direction from a first convex side 612 of the 2D grating 630 to a first concave side 614 of the 2D grating 630, the first convex side 612 being opposite to the first concave side 614; and become gradually larger along the A2 direction from a second convex side 622 of the 2D grating 630 to a second concave side 624 of the 2D grating 630, the second convex side 622 being opposite to the second concave side 624.

In one embodiment, there is a same first distance between centers of every two adjacent scattering elements 632 along the A1 direction; and there is a same second distance between centers of every two adjacent scattering elements 632 along the A2 direction. The first distance may be equal to the second distance.

In another embodiment, the scattering elements 632 gradually change both shapes and sizes along the A1 direction from the first convex side 612 of the 2D grating 630 to the first concave side 614 of the 2D grating 630; and gradually change both shapes and sizes along the A2 direction from the second convex side 622 of the 2D grating 630 to the second concave side 624 of the 2D grating 630.

In another embodiment, the scattering elements 632 become gradually larger along the X direction from a first corner 635 of the 2D grating 630 to a second corner 636 of the 2D grating 630. The second corner 636 is opposite to the first corner 635. The second corner 636 is farther away from the first taper structure 218 and the second taper structure 228 than the first corner 635.

Figure 7A:
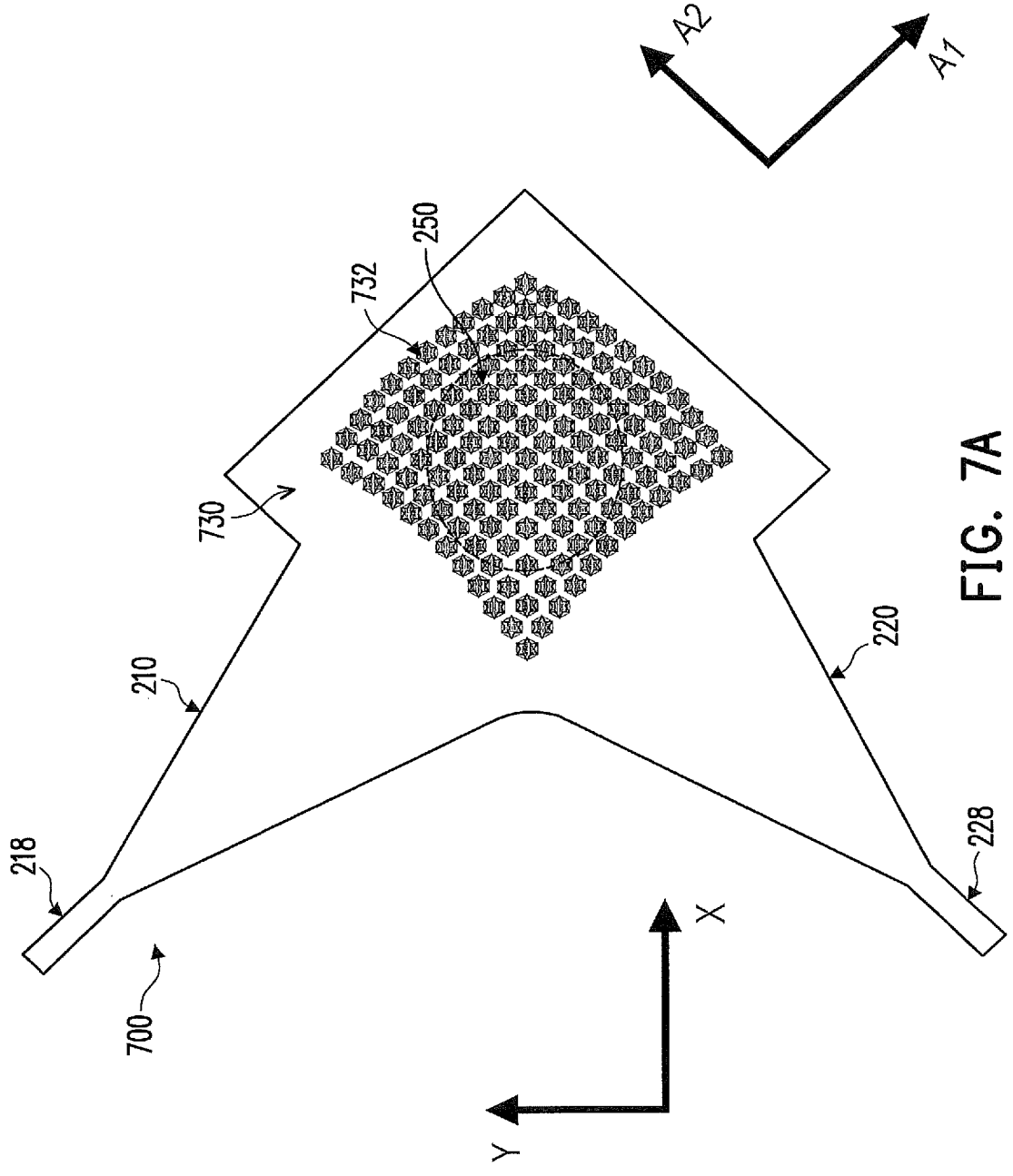
FIG. 7A illustrates a top view of another exemplary 2D grating coupler, in accordance with some embodiments of the present disclosure.

FIG. 7A illustrates a top view of another exemplary 2D grating coupler 700, in accordance with some embodiments of the present disclosure. The 2D grating coupler 700 in FIG. 7 is the same as the 2D grating coupler 200 in FIG. 2A, except that the 2D grating coupler 700 has a grating region 730 including 2D grating formed by an array of scattering elements 732 each of which has a top surface whose shape is a concave polygon having at least 6 reflex interior angles and at least 12 edges.

Figure 7B:
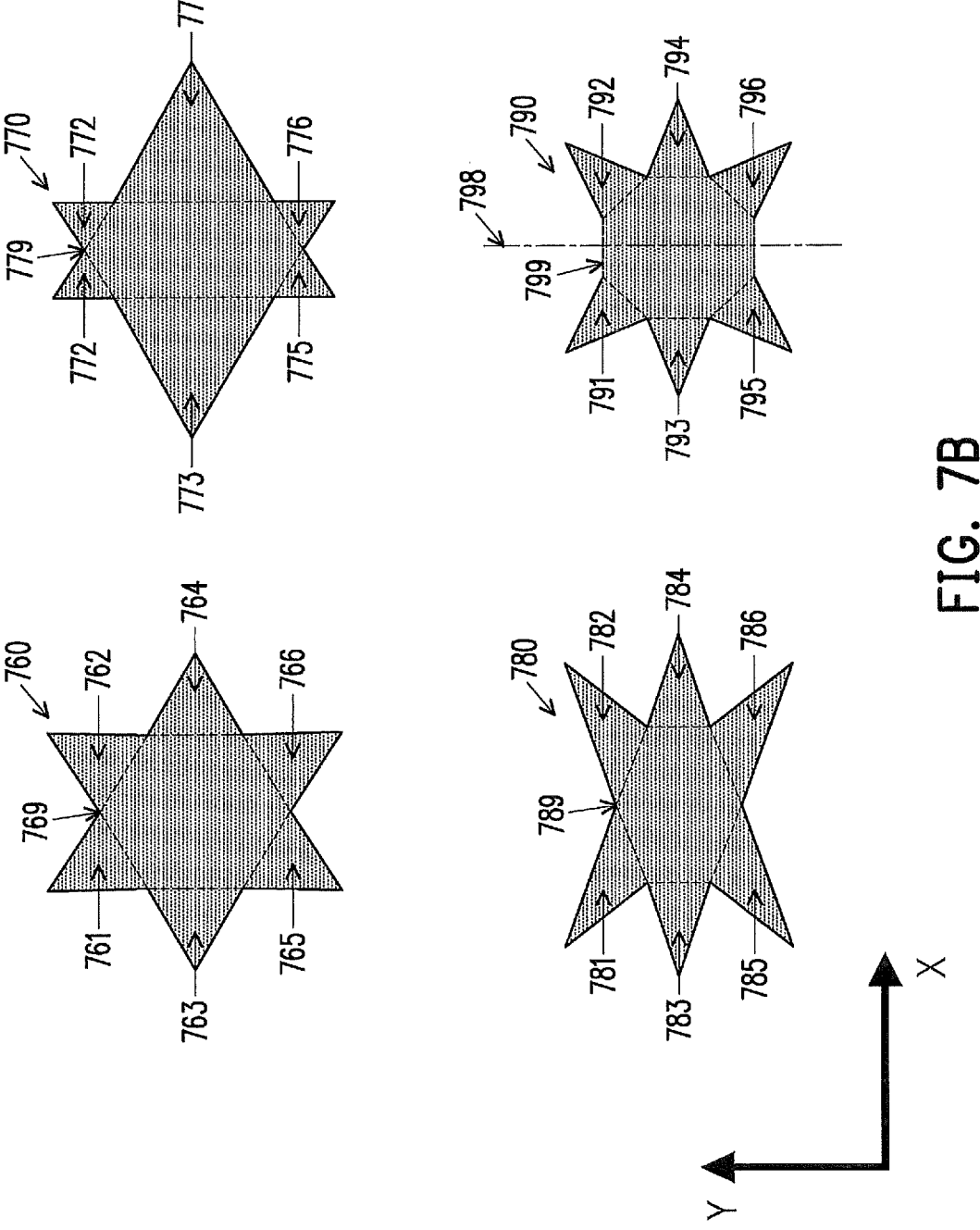
FIG. 7B illustrates some exemplary scattering elements in a 2D grating coupler, in accordance with some embodiments of the present disclosure.

FIG. 7B illustrates some exemplary scattering elements in a 2D grating coupler, e.g. the 2D grating coupler 700 in FIG. 7A, in accordance with some embodiments of the present disclosure. In one embodiment, each scattering element 732 in FIG. 7A may have a shape of a concave polygon 760 having 6 reflex interior angles and 12 edges in total. The concave polygon 760 has reflection symmetry about a line along the X direction and about a line along the Y direction; and has 6-fold rotational symmetry. That is, the concave polygon 760 will look exactly the same after a rotation by an angle of 360°/6=60°. As shown in FIG. 7B, the concave polygon 760 is divisible into a hexagon 769 and six triangles 761, 762, 763, 764, 765, 766, located on six sides of the hexagon 769 respectively. In one embodiment, the six triangles 761, 762, 763, 764, 765, 766 are congruent. In one embodiment, the six triangles 761, 762, 763, 764, 765, 766 are all regular triangles. In one embodiment, the hexagon 769 is a regular hexagon.

In another embodiment, each scattering element 732 in FIG. 7A may have a shape of a concave polygon 770 having 6 reflex interior angles and 12 edges in total. The concave polygon 770 has reflection symmetry about a line along the X direction and about a line along the Y direction; has 2-fold rotational symmetry; but has no N-fold rotational symmetry, when N is larger than 2. As shown in FIG. 7B, the concave polygon 770 is divisible into a hexagon 779 and six triangles 771, 772, 773, 774, 775, 776, located on six sides of the hexagon 779 respectively. In one embodiment, the six triangles 771, 772, 773, 774, 775, 776 include: four regular triangles 771, 772, 775, 776 that are congruent and have a first size, and two regular triangles 773, 774 that are congruent and have a second size larger than the first size.

In yet another embodiment, each scattering element 732 in FIG. 7A may have a shape of a concave polygon 780 having 6 reflex interior angles and 12 edges in total. The concave polygon 780 has reflection symmetry about a line along the X direction and about a line along the Y direction; has 2-fold rotational symmetry; but has no N-fold rotational symmetry, when N is larger than 2. As shown in FIG. 7B, the concave polygon 780 is divisible into a hexagon 789 and six triangles 781, 782, 783, 784, 785, 786, located on six sides of the hexagon 789 respectively. In one embodiment, the six triangles 781, 782, 783, 784, 785, 786 include six isosceles triangles that are congruent. In one embodiment, the six triangles 781, 782, 783, 784, 785, 786 include: four triangles 781, 782, 785, 786 that are congruent and not isosceles triangles, and two isosceles triangles 783, 784 that are congruent.

In still another embodiment, each scattering element 732 in FIG. 7A may have a shape of a concave polygon 790 having 8 reflex interior angles and 14 edges in total. The concave polygon 790 has reflection symmetry about a line along the X direction and about a line 798 along the Y direction; has 2-fold rotational symmetry; but has no N-fold rotational symmetry, when N is larger than 2. As shown in FIG. 7B, the concave polygon 790 is divisible into an octagon 799 and six triangles 791, 792, 793, 794, 795, 796. As shown in FIG. 7B, while the line 798 crosses two sides of the octagon 799, the six triangles 791, 792, 793, 794, 795, 796 are located on the remaining six sides of the octagon 799 respectively. In one embodiment, the six triangles 791, 792, 793, 794, 795, 796 include six isosceles triangles that are congruent. In one embodiment, the six triangles 791, 792, 793, 794, 795, 796 include: four triangles 791, 792, 795, 796 that are congruent and not isosceles triangles, and two isosceles triangles 793, 794 that are congruent. One or more of the scattering elements in any one of FIGS. 1-7A can be replaced by a scattering element having a shape according to one of the above described polygons referring to FIG. 7B, according to various embodiments of the present teaching.

Figure 8:
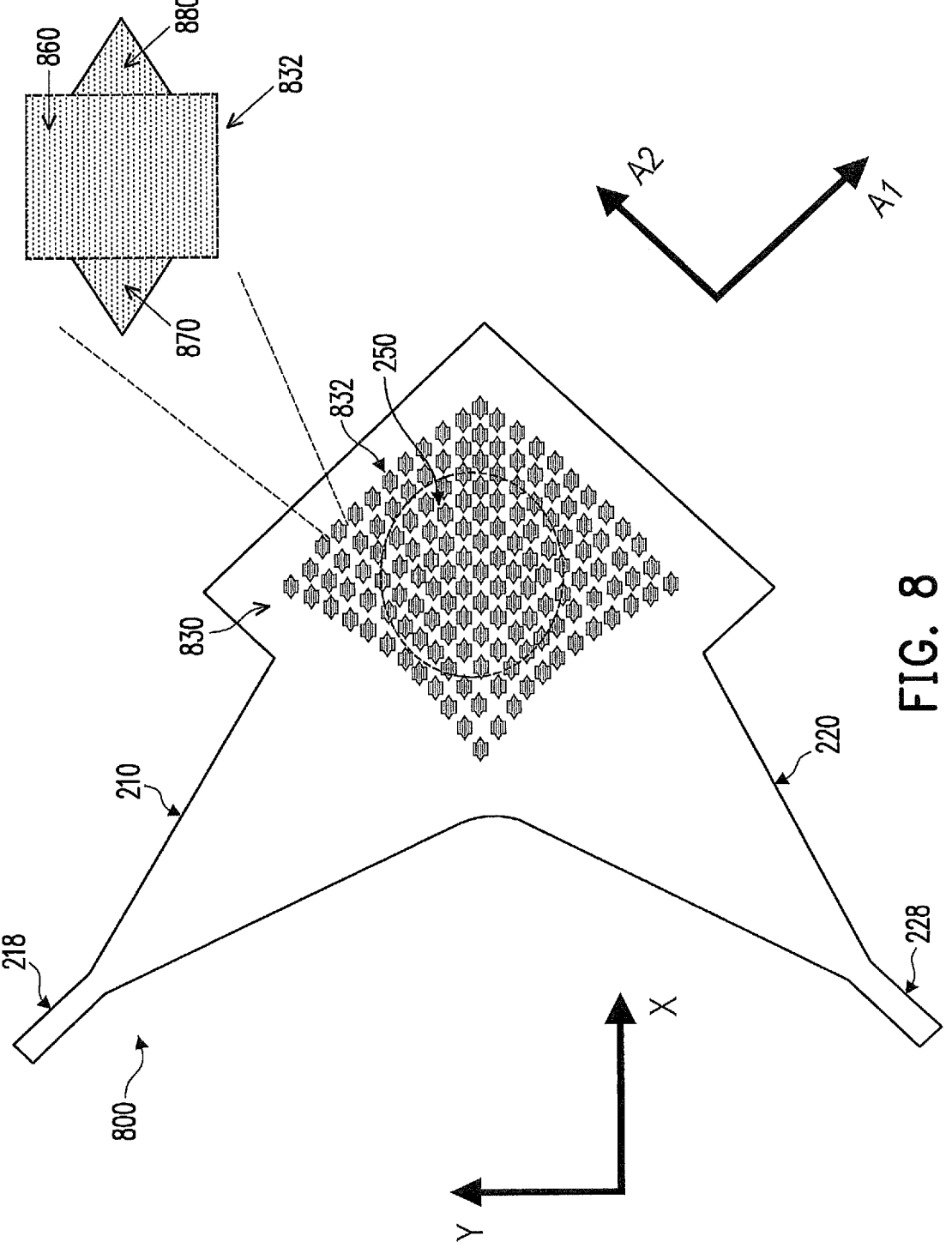
FIG. 8 illustrates a top view of yet another exemplary 2D grating coupler, in accordance with some embodiments of the present disclosure.

FIG. 8 illustrates a top view of yet another exemplary 2D grating coupler 800, in accordance with some embodiments of the present disclosure. The 2D grating coupler 800 in FIG. 8 is the same as the 2D grating coupler 200 in FIG. 2A, except that the 2D grating coupler 800 has a grating region 830 including 2D grating formed by an array of scattering elements 832 each of which has a top surface whose shape is a concave polygon having 4 reflex interior angles and 10 edges in total.

Referring to an expanded view of the scattering elements 832 in FIG. 8, each scattering element 832 may have a shape of a concave polygon having at least one of the following properties. First, the concave polygon has reflection symmetry about a line along the X direction and about a line along the Y direction. Second, the concave polygon has 2-fold rotational symmetry; but has no N-fold rotational symmetry, when N is larger than 2. Third, the concave polygon is divisible into a rectangle 860 and two triangles 870, 880 located on two sides of the rectangle 860, respectively.

In one embodiment, the rectangle 860 is a square. In one embodiment, the two triangles 870, 880 are isosceles triangles that are congruent. In another embodiment, the two triangles 870, 880 are regular triangles that are congruent. One or more of the scattering elements in any one of FIGS. 1-7A can be replaced by a scattering element having a shape as described above referring to FIG. 8, according to various embodiments of the present teaching.

Figure 9:
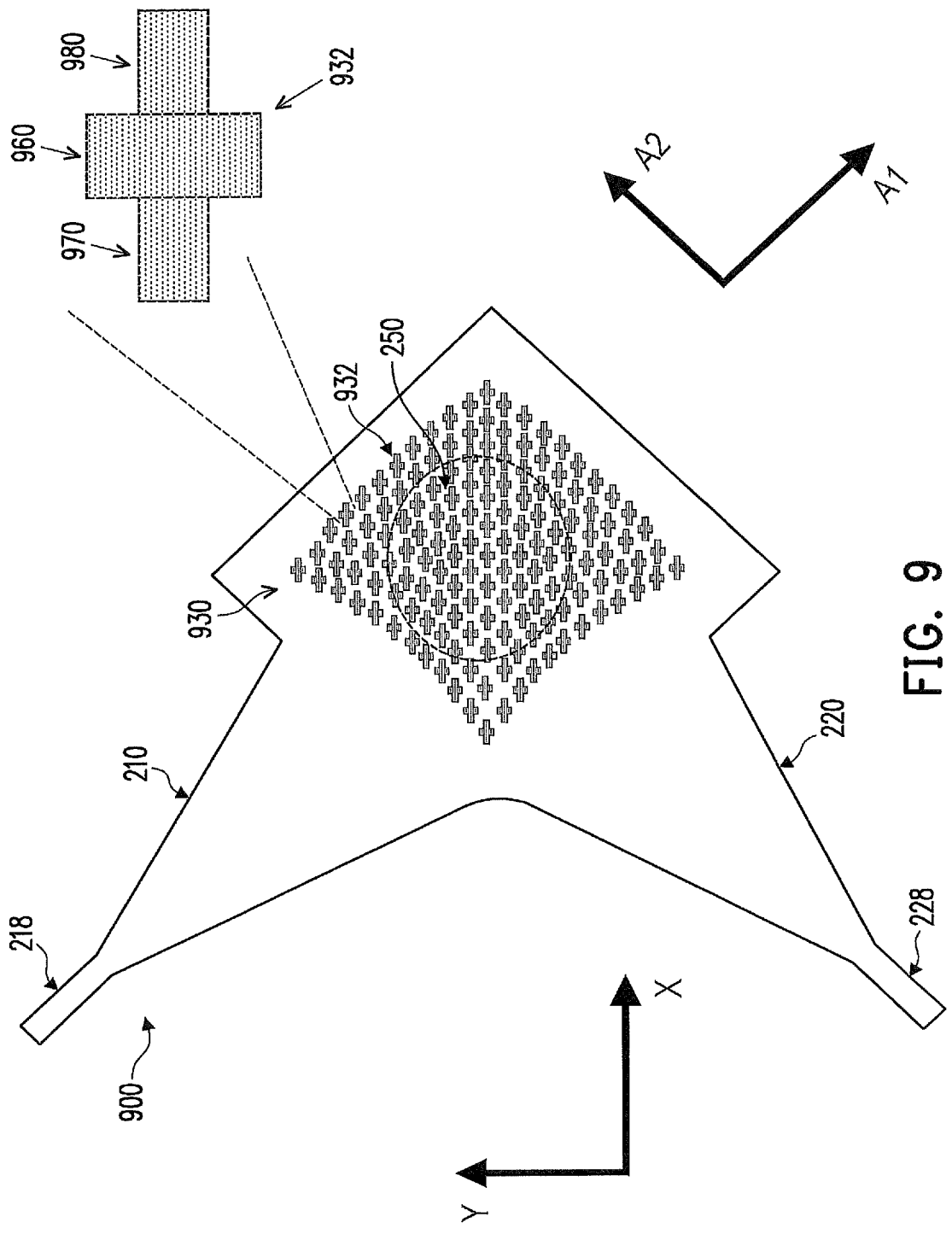
FIG. 9 illustrates a top view of still another exemplary 2D grating coupler, in accordance with some embodiments of the present disclosure.

FIG. 9 illustrates a top view of still another exemplary 2D grating coupler 900, in accordance with some embodiments of the present disclosure. The 2D grating coupler 900 in FIG. 9 is the same as the 2D grating coupler 200 in FIG. 2A, except that the 2D grating coupler 900 has a grating region 930 including 2D grating formed by an array of scattering elements 932 each of which has a top surface whose shape is a concave polygon having 4 reflex interior angles and 12 edges in total.

Referring to an expanded view of the scattering elements 932 in FIG. 9, each scattering element 932 may have a shape of a concave polygon having at least one of the following properties. First, the concave polygon has reflection symmetry about a line along the X direction and about a line along the Y direction. Second, the concave polygon has 2-fold rotational symmetry; but has no N-fold rotational symmetry, when N is larger than 2. Third, the concave polygon is divisible into a rectangle 960 and two horizontal triangles 970, 980 located on two sides of the rectangle 960, respectively. Each horizontal triangle has two longer horizontal edges and two shorter vertical edges.

In one embodiment, the rectangle 960 is a vertical rectangle. A vertical triangle has two longer vertical edges and two shorter horizontal edges. In one embodiment, the rectangle 960 is a square. In one embodiment, the two horizontal triangles 970, 980 are congruent. In another embodiment, the two horizontal triangles 970, 980 are not congruent. One or more of the scattering elements in any one of FIGS. 1-8 can be replaced by a scattering element having a shape as described above referring to FIG. 9, according to various embodiments of the present teaching.

Figure 10:
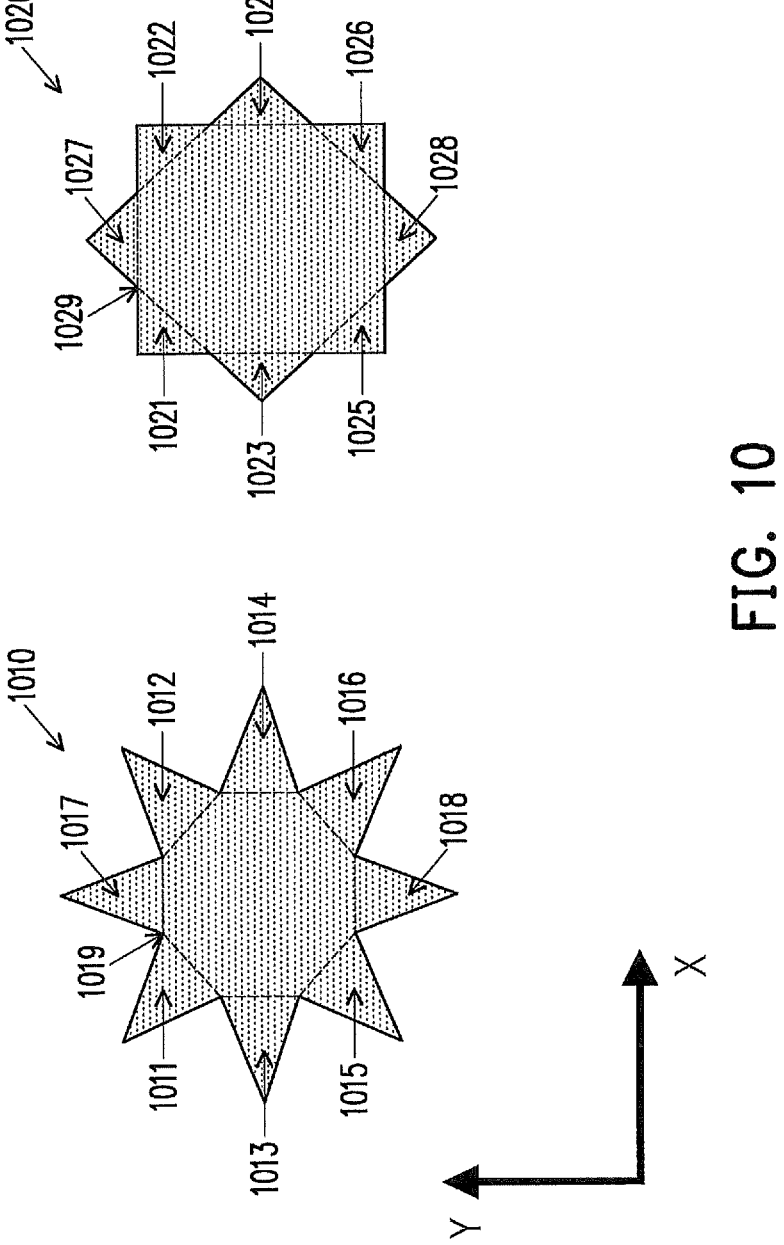
FIG. 10 illustrates additional exemplary scattering elements in a 2D grating coupler, in accordance with some embodiments of the present disclosure.

FIG. 10 illustrates additional exemplary scattering elements in a 2D grating coupler, e.g. any one of the 2D grating couplers shown in FIGS. 1-9, in accordance with some embodiments of the present disclosure. According to various embodiments, each scattering element of the 2D grating coupler may have a shape of a concave polygon 1010 having 8 reflex interior angles and 16 edges in total. According to various embodiments, the concave polygon 1010 has at least one of the following properties. First, the concave polygon 1010 has reflection symmetry about a line along the X direction and about a line along the Y direction. Second, the concave polygon 1010 has 8-fold rotational symmetry; but has no N-fold rotational symmetry, when N is larger than 8. Third, the concave polygon 1010 is divisible into an octagon 1019 and eight triangles 1011, 1012, 1013, 1014, 1015, 1016, 1017, 1018, located on eight sides of the octagon 1019, respectively. In one embodiment, the octagon 1019 is a regular octagon. In one embodiment, the eight triangles 1011, 1012, 1013, 1014, 1015, 1016, 1017, 1018 include eight isosceles triangles that are congruent. In one embodiment, the eight triangles 1011, 1012, 1013, 1014, 1015, 1016, 1017, 1018 include: four triangles 1011, 1012, 1015, 1016 that are congruent and not isosceles triangles; two isosceles triangles 1013, 1014 that are congruent and have a first size; and two isosceles triangles 1017, 1018 that are congruent and have a second size smaller than the first size.

According to various embodiments, each scattering element of the 2D grating coupler may have a shape of a concave polygon 1020 having 8 reflex interior angles and 16 edges in total. According to various embodiments, the concave polygon 1020 has at least one of the following properties. First, the concave polygon 1020 has reflection symmetry about a line along the X direction and about a line along the Y direction. Second, the concave polygon 1020 has 8-fold rotational symmetry; but has no N-fold rotational symmetry, when N is larger than 8. Third, the concave polygon 1020 is divisible into an octagon 1029 and eight triangles 1021, 1022, 1023, 1024, 1025, 1026, 1027, 1028, located on eight sides of the octagon 1029, respectively. In one embodiment, the octagon 1029 is a regular octagon. In one embodiment, the eight triangles 1021, 1022, 1023, 1024, 1025, 1026, 1027, 1028 include eight right triangles that are congruent. In one embodiment, the eight triangles 1021, 1022, 1023, 1024, 1025, 1026, 1027, 1028 include: four right triangles 1021, 1022, 1025, 1026 that are congruent; two isosceles triangles 1023, 1024 that are congruent and have a third size; and two isosceles triangles 1027, 1028 that are congruent and have a fourth size smaller than the third size. One or more of the scattering elements in any one of FIGS. 1-9 can be replaced by a scattering element having a shape as described above referring to FIG. 10, according to various embodiments of the present teaching.

Figure 11:
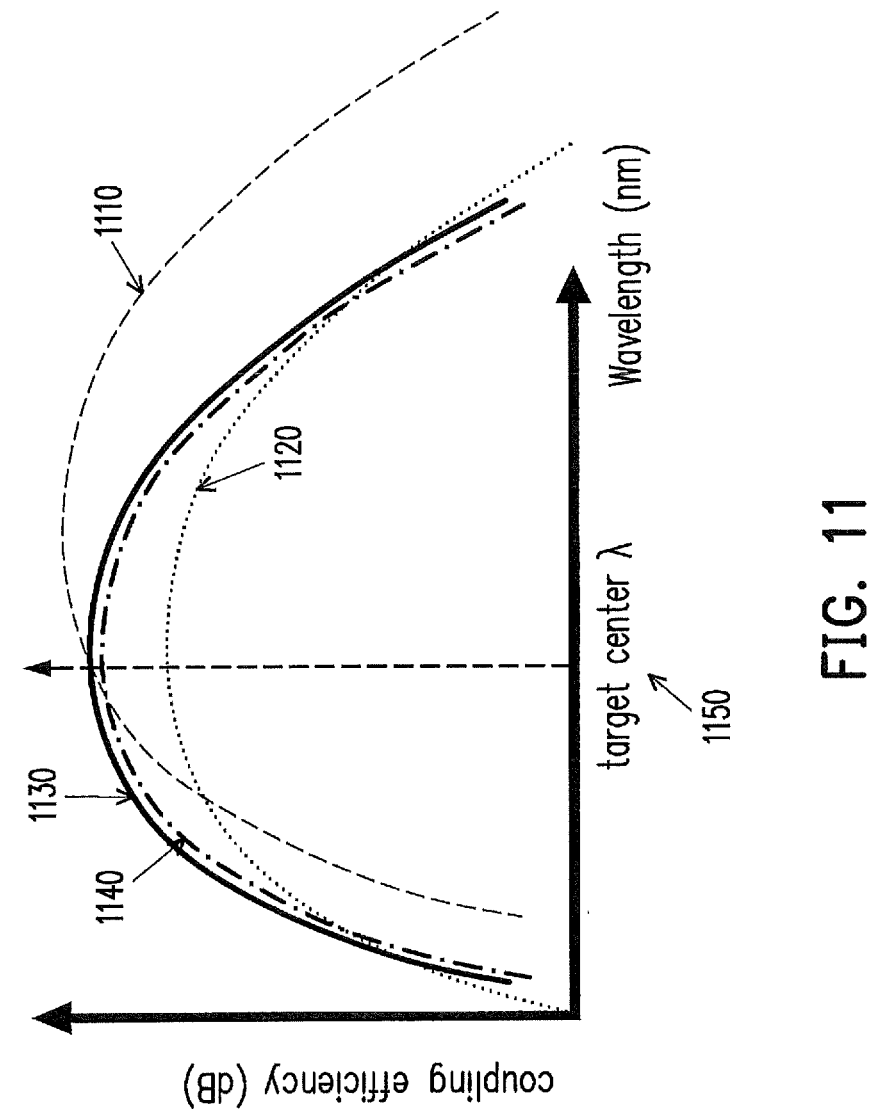
FIG. 11 illustrates exemplary coupling efficiency performances of a disclosed 2D grating coupler and a conventional 2D grating coupler, in accordance with some embodiments of the present disclosure.

FIG. 11 illustrates exemplary coupling efficiency performances of a disclosed 2D grating coupler and a conventional 2D grating coupler, in accordance with some embodiments of the present disclosure. In FIG. 11, the curve 1110 shows a coupling efficiency performance of a conventional PSGC vs. a wavelength spectrum of operational wavelengths of the conventional PSGC with respect to a TE polarized incident light; the curve 1120 shows a coupling efficiency performance of a conventional PSGC vs. a wavelength spectrum of operational wavelengths of the conventional PSGC with respect to a TM polarized incident light; the curve 1130 shows a coupling efficiency performance of a disclosed PSGC vs. a wavelength spectrum of operational wavelengths of the disclosed PSGC with respect to a TE polarized incident light; and the curve 1140 shows a coupling efficiency performance of a disclosed PSGC vs. a wavelength spectrum of operational wavelengths of the disclosed PSGC with respect to a TM polarized incident light. The disclosed PSGC may be formed as any one of the 2D grating couplers disclosed in FIGS. 1-10. As shown in FIG. 11, compared to the conventional PSGC, the disclosed PSGC has very close coupling efficiency performances between the TE and TM polarization lights across the operational wavelength spectrum. At a target center operational wavelength 1150, the disclosed PSGC has a much smaller polarization dependent loss than the conventional PSGC, because of the closer coupling efficiency performances between the TE and TM polarization lights of the disclosed PSGC. In addition, the disclosed PSGC improves coupling efficiency performance compared to the conventional PSGC, because a minimum coupling efficiency of the TE and TM polarization lights of the disclosed PSGC is higher than that of the conventional PSGC, at the target center operational wavelength 1150.

Figure 12:
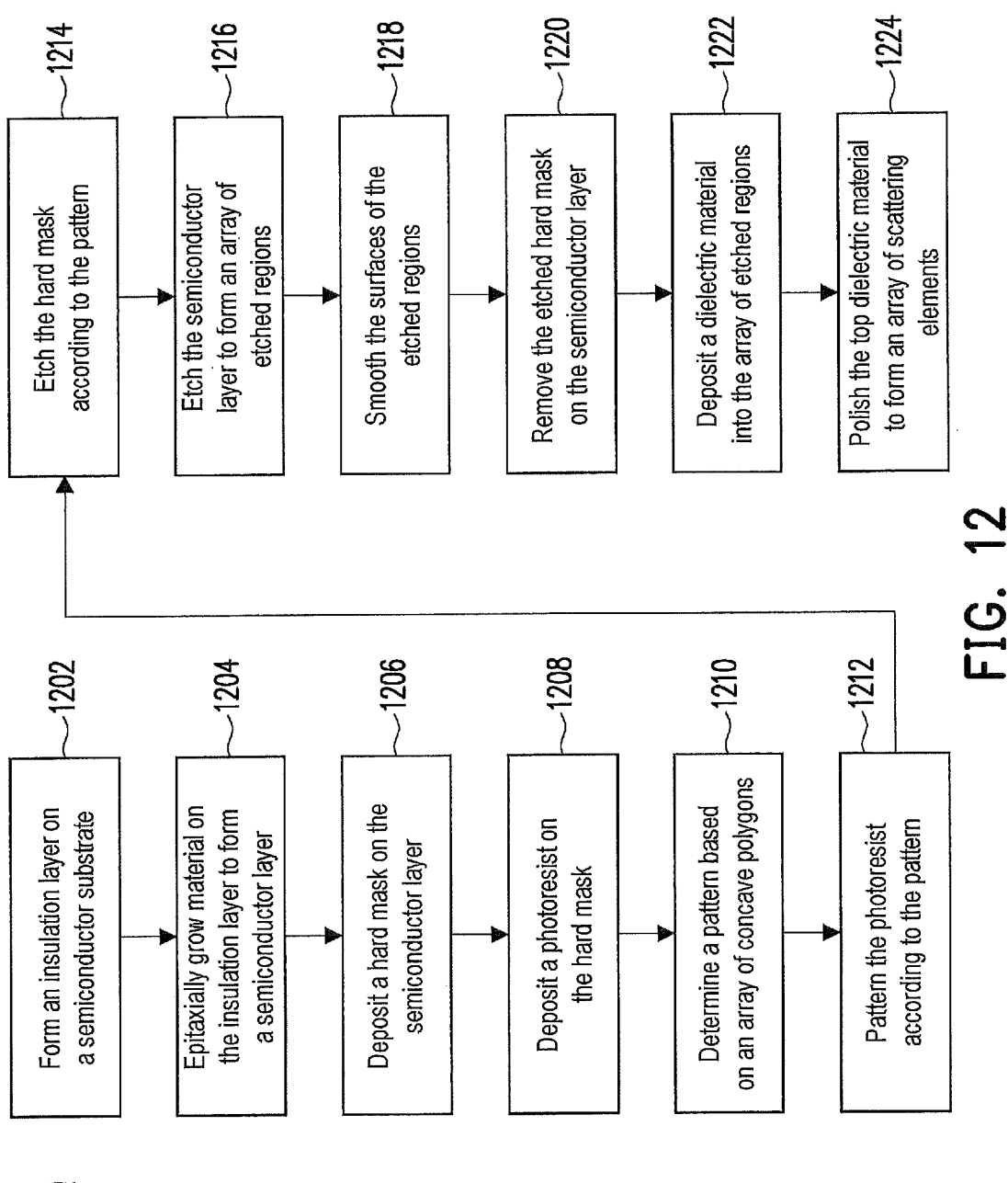
FIG. 12 illustrates a flow chart of an exemplary method for making an exemplary 2D grating coupler, in accordance with some embodiments of the present disclosure.

FIG. 12 illustrates a flow chart of an exemplary method 1200 for making an exemplary 2D grating coupler, e.g. any one of the 2D grating couplers disclosed in FIGS. 1-10, in accordance with some embodiments of the present disclosure. At operation 1202, an insulation layer is formed on a semiconductor substrate. At operation 1204, a semiconductor material is epitaxially grown on the insulation layer to form a semiconductor layer. At operation 1206, a hard mask is deposited on the semiconductor layer. At operation 1208, a photoresist is deposited on the hard mask. At operation 1210, a pattern is determined based on an array of concave polygons. In various embodiments, the concave polygons may have a same shape or different shapes, and/or may have a same size or different sizes, according to the shapes and sizes disclosed in FIGS. 1-10. The pattern may be chosen from the disclosed patterns based on desired shape, geometry and materials of the gratings, as well as a desired operational wavelength range.

At operation 1212, the photoresist is patterned according to the pattern. At operation 1214, the hard mask is etched according to the pattern. At operation 1216, the semiconductor layer is etched to form an array of etched regions. At operation 1218, the surfaces of the etched regions are smoothed, e.g. by repetitively oxidizing the surfaces and etching the oxidized surfaces. At operation 1220, the etched hard mask on the semiconductor layer is removed. At operation 1222, a dielectric material is deposited into the array of etched regions and over the semiconductor layer. At operation 1224, the top dielectric material is polished to form an array of scattering elements. The order of the operations in FIG. 12 may be changed according to various embodiments of the present teaching.

In one embodiment, an apparatus for optical coupling is disclosed. The apparatus includes: a planar layer; an array of scattering elements arranged in the planar layer at a plurality of intersections of a first set of concentric elliptical curves crossing with a second set of concentric elliptical curves rotated proximately 90 degrees to form a two-dimensional (2D) grating; a first taper structure formed in the planar layer connecting a first convex side of the 2D grating to a first waveguide; and a second taper structure formed in the planar layer connecting a second convex side of the 2D grating to a second waveguide. Each scattering element is a pillar into the planar layer. The pillar has a top surface whose shape is a concave polygon having at least 6 corners.

In another embodiment, a system for communication is disclosed. The system includes: a photonic die on a substrate; an optical fiber attached to the photonic die; and an array of scattering elements on the photonic die for transmitting light between the photonic die and the optical fiber. The array of scattering elements is arranged in a planar layer at a plurality of intersections of a first set of concentric elliptical curves crossing with a second set of concentric elliptical curves rotated proximately 90 degrees to form a two-dimensional (2D) grating. The 2D grating is configured for receiving an incident light from the optical fiber with an incident angle. The incident angle is measured in plane of incidence between an axis of the optical fiber and a direction perpendicular to the planar layer. Each scattering element has a first length along a first direction that is in a top surface of the planar layer and perpendicular to the plane of incidence, and has a second length along a second direction that is in the top surface and perpendicular to the first direction. A ratio of the second length to the first length is determined based on the incident angle.

In yet another embodiment, a method for forming an optical coupler is disclosed. The method includes: forming an insulation layer on a semiconductor substrate; epitaxially growing a semiconductor material on the insulation layer to form a semiconductor layer; etching the semiconductor layer to form an array of etched regions in the semiconductor layer according to a predetermined pattern; and depositing a dielectric material into the array of etched regions to form an array of scattering elements in the semiconductor layer. The scattering elements are arranged at a plurality of intersections of a first set of concentric elliptical curves crossing with a second set of concentric elliptical curves rotated proximately 90 degrees to form a two-dimensional (2D) grating. Each scattering element is a pillar in a corresponding one of the etched regions. The pillar has a top surface whose shape is a concave polygon having at least 8 edges.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for forming an optical coupler, comprising:
forming an insulation layer on a semiconductor substrate;
epitaxially growing a semiconductor material on the insulation layer to form a semiconductor layer;
etching the semiconductor layer to form an array of etched regions in the semiconductor layer according to a predetermined pattern; and
depositing a dielectric material into the array of etched regions to form an array of scattering elements in the semiconductor layer, wherein the scattering elements are arranged to form a two-dimensional (2D) grating.

2. The method of claim 1, wherein:
the scattering elements become gradually larger along a first direction from a first convex side of the 2D grating to a first concave side of the 2D grating according to the predetermined pattern, the first convex side being opposite to the first concave side;
the scattering elements become gradually larger along a second direction from a second convex side of the 2D grating to a second concave side of the 2D grating according to the predetermined pattern, the second convex side being opposite to the second concave side;
there is a same first distance between centers of every two adjacent scattering elements along the first direction; and
there is a same second distance between centers of every two adjacent scattering elements along the second direction.

3. The method of claim 2, wherein:
the semiconductor material comprises silicon;
the dielectric material comprises silicon oxide; and
each scattering element of the plurality of scattering elements
is a pillar in a corresponding one of the etched regions, wherein
the pillar has a top surface whose shape is a concave polygon having at least 8 edges, and the concave polygon is symmetric about a line along the first direction and is symmetric about a line along the second direction.

4. The method of claim 2, wherein:
the scattering elements gradually change shapes and sizes from the first convex side of the 2D grating to the first concave side of the 2D grating; and
the scattering elements gradually change shapes and sizes from the second convex side of the 2D grating to the second concave side of the 2D grating.

5. The method of claim 3, wherein the concave polygon is at least one of:
a polygon having 2 reflex interior angles and 8 edges;
a polygon having 4 reflex interior angles and 10 edges;
a polygon having 4 reflex interior angles and 12 edges;
a polygon having 6 reflex interior angles and 12 edges; or
a polygon having 8 reflex interior angles and 16 edges.

6. The method of claim 3, wherein the concave polygon is at least one of:
a polygon that has reflection symmetry about a line which divides the polygon into two convex pentagons;
a polygon that is divisible into a rectangle and two triangles located on two sides of the rectangle respectively;

a polygon that is divisible into a vertical rectangle and two horizontal triangles located on two sides of the vertical rectangle respectively;
a polygon that is divisible into a hexagon and six triangles located on six sides of the hexagon respectively, wherein the six triangles include at least one of:
six regular triangles that are congruent, or
four regular triangles that are congruent and have a first size, and two regular triangles that are congruent and have a second size larger than the first size; or
a polygon that is divisible into an octagon and six isosceles triangles, wherein:
the octagon has reflection symmetry about a line crossing two sides of the octagon, and
the six isosceles triangles are congruent and located on the remaining six sides of the octagon respectively.

7. The method of claim 3, wherein:
the concave polygon has 2-fold rotational symmetry; and
the concave polygon has no N-fold rotational symmetry, when N is larger than 2.

8. A method for optical coupling, comprising:
forming an array of scattering elements arranged in a planar layer, wherein the array of scattering elements form a two-dimensional (2D) grating, and forming the array of scattering elements comprises:
forming a plurality of scattering elements in a semiconductor layer, wherein a thickness of the semiconductor layer is greater than a thickness of each of the plurality of scattering elements;
forming a first taper structure in the planar layer connecting a first convex side of the 2D grating to a first waveguide; and
forming a second taper structure in the planar layer connecting a second convex side of the 2D grating to a second waveguide.

9. The method of claim 8, wherein each scattering element of the array of scattering elements has a shape of a concave polygon, and the concave polygon is at least one of:
a polygon having 2 reflex interior angles and 8 edges;
a polygon having 4 reflex interior angles and 10 edges;
a polygon having 4 reflex interior angles and 12 edges;
a polygon having 6 reflex interior angles and 12 edges; or
a polygon having 8 reflex interior angles and 16 edges.

10. The method of claim 8, wherein each scattering element of the array of scattering elements has a shape of a concave polygon, and the concave polygon is at least one of:
a polygon that has reflection symmetry about a line which divides the polygon into two convex pentagons;
a polygon that is divisible into a rectangle and two triangles located on two sides of the rectangle respectively;
a polygon that is divisible into a vertical rectangle and two horizontal triangles located on two sides of the vertical rectangle respectively;
a polygon that is divisible into a hexagon and six triangles located on six sides of the hexagon respectively, wherein the six triangles include at least one of:
six regular triangles that are congruent, or
four regular triangles that are congruent and have a first size, and two regular triangles that are congruent and have a second size larger than the first size; or
a polygon that is divisible into an octagon and six isosceles triangles, wherein:
the octagon has reflection symmetry about a line crossing two sides of the octagon, and the six isosceles triangles are congruent and located on the remaining six sides of the octagon respectively.

11. The method of claim 8, wherein:

the scattering elements become gradually larger along a first direction from the first convex side of the 2D grating to a first concave side of the 2D grating, the first convex side being opposite to the first concave side; and the scattering elements become gradually larger along a second direction from the second convex side of the 2D grating to a second concave side of the 2D grating, the second convex side being opposite to the second concave side.

12. The method of claim 11, wherein:

there is a same first distance between centers of every two adjacent scattering elements along the first direction; and there is a same second distance between centers of every two adjacent scattering elements along the second direction.

13. The method of claim 12, wherein the first distance is equal to the second distance.

14. The method of claim 11, wherein:

the scattering elements gradually change shapes and sizes from the first convex side of the 2D grating to the first concave side of the 2D grating; and the scattering elements gradually change shapes and sizes from the second convex side of the 2D grating to the second concave side of the 2D grating.

15. The method of claim 8, wherein each scattering element of the array of scattering elements has a shape of a concave polygon, and:

the concave polygon has 2-fold rotational symmetry; and the concave polygon has no N-fold rotational symmetry, when N is larger than 2;

the first taper structure has a reducing first width from the first convex side to the first waveguide;

the second taper structure has a reducing second width from the second convex side to the second waveguide;

the first waveguide comprises a first output port located substantially at a focal point of the first set of elliptical curves; and the second waveguide comprises a second output port located substantially at a focal point of the second set of elliptical curves.

16. A method for communication, comprising:

forming a photonic die on a substrate;

attaching an optical fiber to the photonic die; and forming an array of scattering elements on the photonic die for transmitting light between the photonic die and the optical fiber, wherein:

the array of scattering elements is arranged in a planar layer to form a two-dimensional (2D) grating, the scattering elements become gradually larger along a first direction from a first convex side of the 2D grating to a first concave side of the 2D grating, the first convex side being opposite to the first concave side, and there is a same first distance between centers of every two adjacent scattering elements along the first direction, the 2D grating is configured for receiving an incident light from the optical fiber with an incident angle, the incident angle is measured in plane of incidence between an axis of the optical fiber and a direction perpendicular to the planar layer, each scattering element has a first length along a first direction that is in a top surface of the planar layer and perpendicular to the plane of incidence, and has a second length along a second direction that is in the top surface and perpendicular to the first direction, and a ratio of the second length to the first length is determined based on the incident angle.

17. The method of claim 16, wherein:

the incident angle is zero;

each scattering element has a shape of a concave polygon in the top surface of the planar layer; and the concave polygon has a 4-fold rotational symmetry.

18. The method of claim 16, wherein:

the incident angle is non-zero; and the ratio of the second length to the first length is larger than one.

19. The method of claim 18, wherein the ratio of the second length to the first length becomes larger as the incident angle becomes larger.

20. The method of claim 16, wherein:

each scattering element has a shape of a concave polygon in the top surface of the planar layer;

the concave polygon is symmetric about a line along the first direction and is symmetric about a line along the second direction; and a total area of the array of scattering elements in the top surface is slightly larger than a core size of the optical fiber and is determined based on a diameter of the optical fiber.

* * * * *